(12) United States Patent
Ikegami et al.

(10) Patent No.: US 7,124,858 B2
(45) Date of Patent: Oct. 24, 2006

(54) BRAKE SYSTEM

(75) Inventors: Hiroshi Ikegami, Tokyo (JP); Hitoshi Furukawa, Tokyo (JP); Shinichi Terashima, Tokyo (JP); Minoru Mashiko, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 10/475,497

(22) PCT Filed: Feb. 15, 2002

(86) PCT No.: PCT/JP02/01297

§ 371 (c)(1),
(2), (4) Date: Oct. 22, 2003

(87) PCT Pub. No.: WO03/025412

PCT Pub. Date: Mar. 27, 2003

(65) Prior Publication Data

US 2004/0144600 A1    Jul. 29, 2004

(30) Foreign Application Priority Data

Sep. 18, 2001   (JP) .............................. 2001-283616

(51) Int. Cl.
*B62B 5/04*   (2006.01)

(52) U.S. Cl. .................................... 188/2 F; 280/250.1

(58) Field of Classification Search ................ 188/2 F, 188/74, 78, 323, 324; 280/250.1, 304.1, 280/647, 650
See application file for complete search history.

(56) References Cited

U.S. PATENT DOCUMENTS

| | | | | | |
|---|---|---|---|---|---|
| 2,741,334 | A | * | 4/1956 | Ross | 188/74 |
| 2,859,837 | A | * | 11/1958 | Mize | 188/2 F |
| 3,310,137 | A | * | 3/1967 | Aurelia et al. | 188/323 |
| 3,599,762 | A | * | 8/1971 | Cox et al. | 188/173 |
| 4,422,660 | A | * | 12/1983 | Costello et al. | 280/250.1 |
| 4,456,102 | A | * | 6/1984 | Peitz | 188/331 |
| 4,538,825 | A | * | 9/1985 | Delahoussaye et al. | 280/250.1 |
| 4,641,848 | A | * | 2/1987 | Ayers | 280/250.1 |
| 4,700,816 | A | * | 10/1987 | Rath | 188/323 |
| 6,341,671 | B1 | * | 1/2002 | Ebersole | 188/2 F |
| 6,422,362 | B1 | * | 7/2002 | Schmidt et al. | 188/339 |

FOREIGN PATENT DOCUMENTS

GB             2053391 A       2/1981

(Continued)

*Primary Examiner*—Christopher P. Schwartz
(74) *Attorney, Agent, or Firm*—Morgan, Lewis & Bockius LLP

(57) ABSTRACT

An object of the invention is to provide a brake apparatus which can facilitate slope starting and slope climbing and which can be produced small in size and light in weight. In addition, another object of the invention is to provide a brake apparatus which can obtain a stable brake force under any conditions including running in the rain.

The invention provides a brake apparatus in which a restriction is imposed on the rotation of a wheel (101) via a brake drum (3) provided on a rotational shaft of the wheel (101) so as to rotate together with the rotational shaft, the brake apparatus being characterized by comprising a brake shoe (30) for imposing a restriction on the rotation of the brake drum (3) in a forward or backward direction through wedge engagement with an inner circumferential surface of the brake drum (3) when the brake drum (3) rotates either in the forward direction or in the backward.

14 Claims, 20 Drawing Sheets

FOREIGN PATENT DOCUMENTS

| | | |
|---|---|---|
| JP | 7-227408 | 8/1995 |
| JP | 3027486 U | 5/1996 |
| JP | 11-28231 | 2/1999 |
| JP | 2001-17479 | 1/2001 |
| JP | 2002-61681 | 2/2002 |
| JP | 2002-89595 | 3/2002 |

* cited by examiner

FORWARD ROTATION ← | → BACKWARD ROTATION

BRAKE SYSTEM

TECHNICAL FIELD

The present invention relates to a brake apparatus, and more particularly to a brake apparatus which is preferably used on light vehicles such as wheel chairs and baby carriages.

BACKGROUND ART

In general, a brake mounted on a wheel chair is constructed such that a swingable lever is provided on a frame of the wheel chair so that part of the lever is pressed against a wheel to apply brakes. Note that since wheels of a wheel chair are constructed to rotate independently, brakes are designed to be applied to the wheels simultaneously.

Incidentally, when a user attempts to start a wheel chair on a slope while being seated therein, an operation is required of releasing brakes while rotating both wheels. However, both hands of the user are occupied to rotate the both wheels in this state. Therefore, it is extremely difficult to operate the lever to release the brakes in the state.

Even if the user operates the lever with one of the hands while press holding one of the wheels with the other hand, the wheel chair so stopped on the slope tends to turn on the wheel so press held with the one hand as an axis, and this may put the user in a dangerous situation. In addition, when the user is so old that he or she does not have enough physical strength, it is easily conceived that he or she cannot start his or her wheel chair on the slope due to a shortage of physical strength required to press hold the wheels.

In addition, not only when starting the wheel chair on the slope but also when climbing up the slope, an action to keep the wheel chair moving forward needs to be taken quickly within a very limited period of time while the wheel chair is advancing on inertia as a result of the rotation of the wheels by the user. Namely, unless the wheels are operated to rotate quickly and continuously, the wheel chair is forced to move backward. Consequently, it is extremely difficult for older and heavily handicapped people to keep the wheel chair running on the slope.

Then, with a view to attaining safe and easy start and continuous climbing movement of the wheel chair on the slope, improved brake apparatuses are proposed in JP-A-7-227408 and JP-A-11-28231.

In the case of a brake apparatus described in JP-A-7-227408, a brake arm is pressed against a wheel by operating a lever so that a braking portion attached to a distal end of the arm is brought into contact with the wheel so as to generate a braking force. However, there are provided two such braking portions, one braking portion functioning as a normal brake apparatus of a type in which brakes are applied while the wheels rotate forward and backward, the other braking portion functioning as a reverse-rotation preventing brake of a type in which brakes are applied only when the wheels rotate backward. Consequently, by using this apparatus, being prevented from descending the slope, the user can safely start the wheel chair from rest on a slope and keep it climbing the slope without having to release the brakes.

On the other hand, in the case of a brake apparatus described in JP-A-11-28231, a normal brake apparatus and a slop-starting brake apparatus are provided in a parallel fashion; the normal brake apparatus being of a type in which brakes are applied when a wheel chair is moved forward and backward by pressing a brake arm against a wheel through operation of a lever, the slope-starting brake apparatus being of a type in which a one-way roller (a roller designed to rotate smoothly in one direction but not to rotate in an opposite direction) is separably brought into contact with a wheel by operating a slope-staring lever which is provided separately from the normal brake lever so that brakes are automatically applied only when the wheel chair is moved backward when the one-way roller is brought into contact with the wheel, whereby when the wheel chair is started from rest on the slope, the wheel chair is only allowed to move forward by allowing only the one-way roller to be brought into contact with the wheel. Consequently, the safe slop starting and climbing can be attained without paying attention to release of the brakes.

However, in either of the brake apparatuses, since the brake force which enables the safe and easy slope starting and climbing is obtained through the construction in which the special members (the arms and the one-way roller) are brought into direct contact with the wheel, there has been caused a problem that the brake apparatus needs to be enlarged in size and weight as the wheels become larger.

In addition, since the brake force is constructed to be obtained through direct contact with the wheels, friction force between the brake member which contacts the surface of the wheel and the wheel changes due to various factors such as the wet surface of the wheel which would result, for example, when the wheel chair is running in the rain, the degree of wear of the wheel (tire) and the air pressure of the wheel, and this change in friction force calls for a change in brake force, leading to a problem that it is difficult to maintain a stable braking performance.

Additionally, since the brake members are exposed outside, there is also caused a problem that the appearance of the wheel chair itself which is equipped with the brake apparatus is aesthetically damaged.

The invention was made in view of the problems that have been described heretofore, and an object thereof is to provide a brake apparatus which can facilitate slope starting and climbing and which can be reduced in size and weight, and another object of the invention is to provide a brake apparatus which can obtain a stable brake force in every condition including running in the rain.

DISCLOSURE OF THE INVENTION

With a view to resolving the aforesaid technical problems, the invention adopts the following means.

(1) A brake apparatus in which a restriction is imposed on the rotation of a wheel via a brake drum provided on a rotational shaft of the wheel so as to rotate together with the rotational shaft, the brake apparatus being characterized by comprising a brake means for imposing a restriction on the rotation of the brake drum in a forward or backward direction through wedge engagement with an inner circumferential surface of the brake drum when the brake drum rotates either in the forward direction or in the backward.

(2) With a view to attaining the objects, in a brake apparatus as set forth in (1) above, the brake means may be adapted for wedge engagement with the inner circumferential surface of the brake drum when the brake drum rotates backward to thereby impose a restriction on the rotation of the brake drum.

Note that in the brake apparatus according to the invention, the backward rotation of the brake drum means a backward rotation of the wheel, and the forward rotation of the brake drum means a forward rotation of the wheel. In addition, the wedge engagement has a meaning of an engaged state which makes use of a self-energizing effect.

In the brake apparatus constructed as has been described above, since there is provided the brake means which exhibits a brake force via the brake drum without direct contact with the wheel (tire), even if the contact resistance on the surface of the wheel changes due to various factors such as the wet surface of the wheel that would result from running in the rain, the degree of wear of the wheel (tire) and the air pressure of the wheel, a stable brake force can be obtained at all times.

In addition, with the brake means which is constructed to exhibit the brake force when the brake drum rotates backward, under a condition where the wheels revolve backward as occurring, for example, when the wheel chair is started from rest on a slope or kept climbing the slope, since the brakes are automatically applied irrespective of a will of the user, the user does not have to pay attention to the backward rotation of the wheels, whereby the slope starting and climbing can be facilitated.

Additionally, since the brake means is incorporated within the brake drum, when compared with the conventional construction in which the brake means is brought into direct contact with the wheel, the parts do not have to be enlarged in size according to the size of the wheels, whereby the size and weight can be reduced. Then, since the exposure of the braking parts to the outside can be prevented due to the incorporation thereof within the brake drum, the appearance of a wheel chair equipped with the brake apparatus can aesthetically be improved.

(3) With a view to attaining the objects, in a brake apparatus as set forth in (1) or (2) above, the brake apparatus may further have a brake force selecting means for arbitrarily selecting the existence or non-existence of a brake force applied to the wheel by being changed over either to an auxiliary brake mode in which the brake force by the brake means is applied to the brake drum, or to a brake release mode in which the brake force by the brake means is made to be ineffective.

(4) With a view to attaining the objects, in a brake apparatus as set forth in (3) above, the brake means may have a lock shoe rotatably provided on a designated stationary shaft supported inwardly of the brake drum, and the brake force selecting means may comprise a lock shoe restraining lever for restraining the lock shoe at a position which is spaced apart from the inner circumferential surface of the brake drum, whereby in the auxiliary brake mode, a restrained state of the lock shoe by the lock shoe restraining lever is released, and in the brake release mode, the restrained state of the lock shoe by the lock shoe restraining lever is maintained.

In the brake apparatus constructed as has been described above, the existence and non-existence of a brake force applied to the wheel can arbitrarily selected by changing over the operations of the lock shoe restraining arm by the brake force selecting means. For example, the wheel chair can run safely even under a condition where the wheels rotate backward by changing over the brake force selecting means to the auxiliary brake mode. In addition, since no brake is applied either when the wheel chair moves forward or when it moves backward by changing over the brake force selecting means to the brake release mode, the wheel chair can be moved forward and backward according to the will of the user.

(5) With a view to attaining the objects, in a brake apparatus as set forth in (4) above, the brake means may comprise a first brake means adapted for wedge engagement with the inner circumferential surface of the brake drum when the brake drum rotates backward to thereby impose a restriction on the rotation of the brake drum in the backward direction, and a second brake means adapted for wedge engagement with the inner circumferential surface of the brake drum when the brake drum rotates forward to thereby impose a restriction on the rotation of the brake drum in the forward direction, wherein the brake force selecting means has an auxiliary brake mode in which only a brake force by the first brake means is applied to the brake drum, a brake lock mode in which the brake force by the first brake means and a brake force by the second brake means are applied to the brake drum, and a brake release mode in which the brake force by the first brake means and the brake force by the second brake means are both made to be ineffective.

(6) With a view to attaining the objects, in a brake apparatus as set forth in (5) above, the first brake means may have further a lock shoe for backward rotation which is rotatably provided on the designated stationary shaft supported inwardly of the brake drum, the second brake means may have a lock shoe for forward rotation which is rotatably provided on the designated stationary shaft in a such a manner as to confront the backward rotation lock shoe of the first brake means, and the brake force selecting means may have a lock shoe restraining arm for individually restraining the respective lock shoes at a position which is spaced apart from the inner circumferential surface of the brake drum, whereby in the auxiliary brake mode, only a restrained state of the backward rotation lock shoe by the lock shoe restraining arm is released, in the brake lock mode, restrained states of the backward rotation lock shoe and the forward rotation lock shoe by the lock shoe restraining arm are both released, and in the brake release mode, the restrained states of the backward rotation lock shoe and the forward rotation lock shoe by the lock shoe restraining arm are both are maintained.

In the brake apparatus constructed as has been described above, for example, in addition to the facilitation of the slope starting and climbing, the wheels are locked by changing over the brake force selecting means to the brake lock mode, whereby the wheel chair can be stopped in an ensured fashion even on an inclined ground. In addition, since the brake means which exhibits various types of brake forces can be constituted by the brake drum, the backward rotation lock shoe, the forward rotation brake shoe and the lock shoe restraining arm, the brake means so constituted is suitable for reducing the size and weight and can be produced inexpensively. Additionally, since the respective constituent parts are incorporated in the interior of the brake drum, this can contribute to aesthetically improving the appearance.

(7) With a view to attaining the objects, according to the invention, there is provided a brake apparatus for restricting the rotation of a brake drum which rotates together with a rotational shaft of a wheel, the brake apparatus being characterized by comprising a first brake means adapted for application to an inner circumferential surface of the brake drum to thereby restrict the rotation of the brake drum in both directions, and a second brake means adapted for application to the inner circumferential surface of the brake drum to thereby restrict the rotation of the brake drum only in one direction.

In the brake apparatus constructed as has been described above, since the rotation of the brake drum (wheel) is restricted by the second brake means under the condition where the wheel rotates only in one direction such as when the wheel chair is kept climbing a slope and started from rest on the slope, the wheel chair can move forward without being forced to move backward even when being started from rest on a slope and kept climbing the slope.

In addition, since the brake for normal running and the auxiliary brake which functions as a brake for slope starting and climbing are incorporated within the brake drum provided on the rotational shaft of the wheel, being different from the conventional case where the brake means is brought into direct contact with the wheel, the brake means does not have to be enlarged in size as the wheel is enlarged, whereby the brake apparatus can be produced small in size and light in weight at inexpensive costs. Additionally, since the brake means is provided which can obtain the brake force by being applied to the brake drum not by being brought into direct contact with the wheel, a stable and constant brake force can be obtained at all times even in states where the wheel chair is run in the rain and the tire gets worn.

(8) With a view to attaining the objects, according to the invention, there is provided a brake apparatus as set forth in (7) above, which may have further a mode selection means for arbitrarily selecting a brake force applied to the brake drum by being changed over to any of a main brake mode in which the first brake means is applied to the brake drum, a brake release mode in which the first brake means and the second brake means are both made to be inoperative, and an auxiliary brake mode in which the second brake means is applied to the brake drum.

In the brake apparatus constructed as has been described above, the brake forces applied to the wheel can arbitrarily be changed over through a single action which operates the mode selection means. Then, at the time of normal running where the wheels are freely rotated forward and backward, by selecting the main brake mode, the brakes are applied based on his or her own will of the user. In addition, in case the brake release mode is selected, since no brake is applied both when the wheels are rotated forward and when the wheels are rotated backward, a nimble movement of the wheel chair by a third person can be facilitated. Additionally, in a condition where the wheels rotate in one direction, for example, on a slope or an inclined ground, by selecting the auxiliary brake mode, since the backward rotation of the wheels can be prevented by applying the brakes when the wheels rotate backward, the wheel chair can easily be started from rest on a slope and kept climbing the slope.

(9) With a view to attaining the objects, in addition to the construction of the brake apparatus as set forth in (8) above, the first brake means can have a pair of brake shoes rotatably provided on a designated stationary shaft supported inwardly of the brake drum, the second brake means can have a lock shoe rotatably provided on the designated stationary shaft and biased so as to be brought into contact with the inner circumference of the brake drum in a normal state, and the mode selection means can have a lock shoe restraining arm for restraining the lock shoe at a position which is spaced apart from the inner circumferential surface of the brake drum, and an actuation cam for pressing the pair of brake shoes against the inner circumferential surface of the brake drum in the main brake mode, for releasing the restraint of the lock shoe by the lock shoe restraining arm in the auxiliary brake mode, and for causing the brake shoes to move apart from the inner circumferential surface of the brake drum and maintaining a restrained state of the lock shoe by the lock shoe restraining arm in the brake release mode.

Note that in the above description, the normal state means a state where no external force is applied.

According to the construction described above is adopted, the brake apparatus itself can be realized with a relatively small number of parts such as, in addition to the brake drum provided on the wheel, the brake shoes for normal braking, the lock shoe for auxiliary braking, the lock shoe restraining arm for making the auxiliary brake inoperative, and the actuation cam for controlling the operations of the pair of brake shoes and the lock shoe restraining arm according to the respective modes, and by incorporating the respective parts within the brake drum, the brake apparatus can be attempted to be made smaller in size and lighter in weight, and the costs can also be attempted to be reduced.

(10) With a view to attaining the objects, according to the invention, there is provided a brake apparatus for restricting the rotation of a brake drum which rotates together with a rotational shaft of a wheel, the brake apparatus being characterized by comprising a pair of main brake shoes rotatably supported on a back plate so as to be pressed against an inner circumferential surface of the brake drum which rotates together with the wheel by expansion means to thereby restrict the rotation of the wheel in a forward direction and a backward direction, and a backward braking brake shoe rotatably supported on the back plate so as to be brought into engagement with the inner circumferential surface of the brake drum to thereby restrict the rotation of the wheel in the backward direction, wherein a contact surface of the backward braking brake shoe with the brake drum is disposed between a contact surface of one brake shoe of the pair of brake shoes with the brake drum and the expansion means.

Note that when used herein, the forward rotation of the wheel means the rotation of the wheel in an advancing direction of the wheel, whereas the backward rotation of the wheel means the rotation of the wheel in a reversing direction of the wheel.

In the brake apparatus constructed as has been described above, since the rotation of the wheel in the backward direction is restricted by the backward braking brake shoe when the wheel rotates backward, even when it is started from rest on a slope and kept climbing the slope, the wheel chair can be kept advancing without being forced to be reversed.

In addition, the backward braking brake shoe and the device for pressing this backward braking brake shoe against the inner circumferential surface of the brake drum can all be incorporated within the brake drum provided on the rotational shaft of the wheel, whereby the brake apparatus can be attempted to be made smaller in size and lighter in weight, and the production costs can also be attempted to be reduced.

Additionally, since the brake force is obtained by virtue of friction with the brake drum not by virtue of direct contact with the wheel, a constant brake force can stably be obtained at all times even in states in which the wheel chair is run in the rain, the tire gets worn and the air pressure of the tire is reduced.

(11) With a view to attaining the objects, in addition to the construction of the brake apparatus as set forth in (10) above, furthermore, the backward braking brake shoe is provided at a position where the contact surface is brought into contact with the inner circumferential surface of the brake drum automatically by self-locking effect.

In the brake apparatus constructed as has been described above, when the wheel chair is started from rest on a slope and is kept climbing the slope, in case the backward rotation of the wheel occurs and the brake is started to be applied by the backward braking brake shoe, since the braking state is securely maintained due to the self-lock of the backward braking brake shoe until the backward rotation of the wheel is eliminated, the reliability in braking for preventing backward rotations is improved.

(12) With a view to attaining the objects, in addition to the construction of the brake apparatus as set forth in (10) or (11) above, the brake apparatus can have a mode selection means for arbitrarily selecting a brake force applied to the wheel by being changed over to any of a main brake mode in which the rotation of the brake drum is restricted by the pair of main brake shoes, an auxiliary brake mode in which the backward rotation of the brake drum is restricted by the backward braking brake shoe, and a brake release mode in which the restrictions on the rotation of the brake drum by the pair of main brake shoes and the backward braking brake shoe are both released.

(13) With a view to attaining the objects, in addition to the construction of the brake apparatus as set forth in (12) above, the mode selection means can have a member for causing the brake shoes and the backward braking brake shoe to move away from or to press against the inner circumferential surface of the brake drum, and can further be constructed such that in the main brake mode, the backward braking brake shoe is held at a position which is spaced apart from the inner circumferential surface of the brake drum, and the pair of main brake shoes are pressed against the inner circumferential surface of the brake drum, in the auxiliary brake mode, the backward braking brake drum is pressed against the inner circumferential surface of the brake drum, and the pair of main brake shoes are held at a position which is spaced apart from the inner circumferential surface of the brake drum, and in the brake release mode, the pair of main brake shoes are spaced apart from the inner circumferential surface of the brake drum, and the held state of the backward braking brake shoe is maintained.

With a view to obtaining higher braking performance on the brake apparatus described in (10) above, the brake apparatuses described in (11) to (13) are such as to indicate preferred combinations of locations, dimensions and configurations of the constituent parts, and with such constructions, the original goal of reduction in size, weight and cost can easily be attained.

Figure 1:
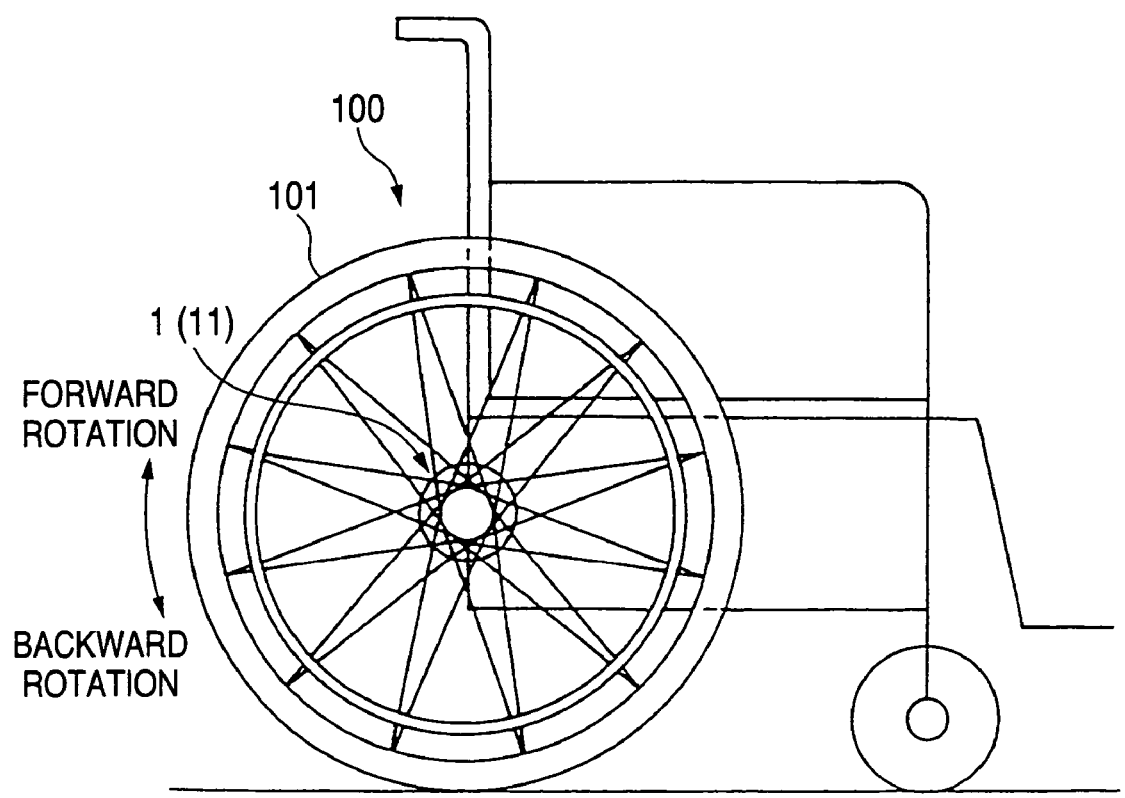
FIG. 1 is a right side view of a wheel chair to which a brake apparatus according to the invention is applied.

Note that in the drawings reference numerals 1, 11 denote a brake apparatus, 3 a brake drum; 3a base plate portion, 3b a circumferential wall (a brake drum inner circumferential surface), 5 a back plate, 5a an axle through mounting hole, 5b an anchor pin (a stationary shaft), 5c an arm supporting shaft, 6 a shoe spring, 7, 17 a lock shoe restraining arm, 7a a lever main body, 7b, 17b a guide pin, 7c, 17c an operating lever, 7d, 17d a restraining arm main body, 14 a leading shoe (a main brake shoe), 14a a leading shoe abutment portion, 14b a leading shoe fixing hole, 14c a leading shoe lining, 15 a trailing shoe (a main brake shoe), 15a a trailing shoe abutment portion, 15b a trailing shoe fixing hole, 15c a trailing shoe lining, 21 a brake apparatus, 22 a brake shoe (a first brake means), 23 a shoe main body, 23a a contact point, 23b a fixing hole, 24 a lining, 25 a back plate, 25a an axle pass-through hole, 25b spring support arm, 26 a lock shoe, 26a rock shoe main body, 26b a lock lining, 27 a lock shoe restraining arm, 28 an actuation cam, 30 a lock shoe (a brake means), 31 a guide groove, 31A a lock shoe releasing position, 31B a lock shoe restraining position, 32 a fixing hole, 33 a shoe main body, 34 a lining, 40 a backward rotation lock shoe (a brake means), 41 a guide groove, 41A a first releasing position, 41B a restraining position, 41C a second releasing position, 44 a lining, 50 a forward rotation lock shoe, 51 a guide groove, 51A a first restraining position, 51B a second restraining position, 51C a releasing position, 54 a lining, 61 a spring, 62 a lock shoe spring, 63 a rock shoe restraining spring, 65 an anchor pin, 66 an arm main body, 66a a contact portion, 66b a lock shoe support pin, 67 a lock shoe restraining pin, 69 a lock shoe restraining arm anchor pin, 71 an operating lever, 81 a brake apparatus, 83 a back plate, 83a an axle pass-through hole, 83b a spring support arum, 83c a back plate pin, 84 a lock shoe (a backward braking brake shoe), 84a lock shoe abutment portion, 84b a lock shoe fixing hole, 84c a lock shoe pin, 86 a lock shoe spring, 88 an actuation cam, 89 an anchor pin, 92 a lock shoe lining, 90 a brake shoe spring, 100 a wheel chair, 101 a wheel, 102 a hub, 103 a spoke, 104 a frame, 110 a brake lever, 111 a wire, 112 a base plate, 112a a mode selection groove, 113 a brake lever support bracket, 113a a cut and erect portion, 114, a brake lever support pin, 115 a lever main body, 116 a hand rail, 118 a spring, and 201 a wheel chair.

BEST MODE FOR CARRYING OUT THE INVENTION

Embodiments of brake apparatuses according to the invention will be described in detail based on the drawings.

[First Embodiment]

FIGS. 1 to 5 shows a first embodiment of a brake apparatus according to the invention as being equipped on a wheel chair 100.

Figure 3:
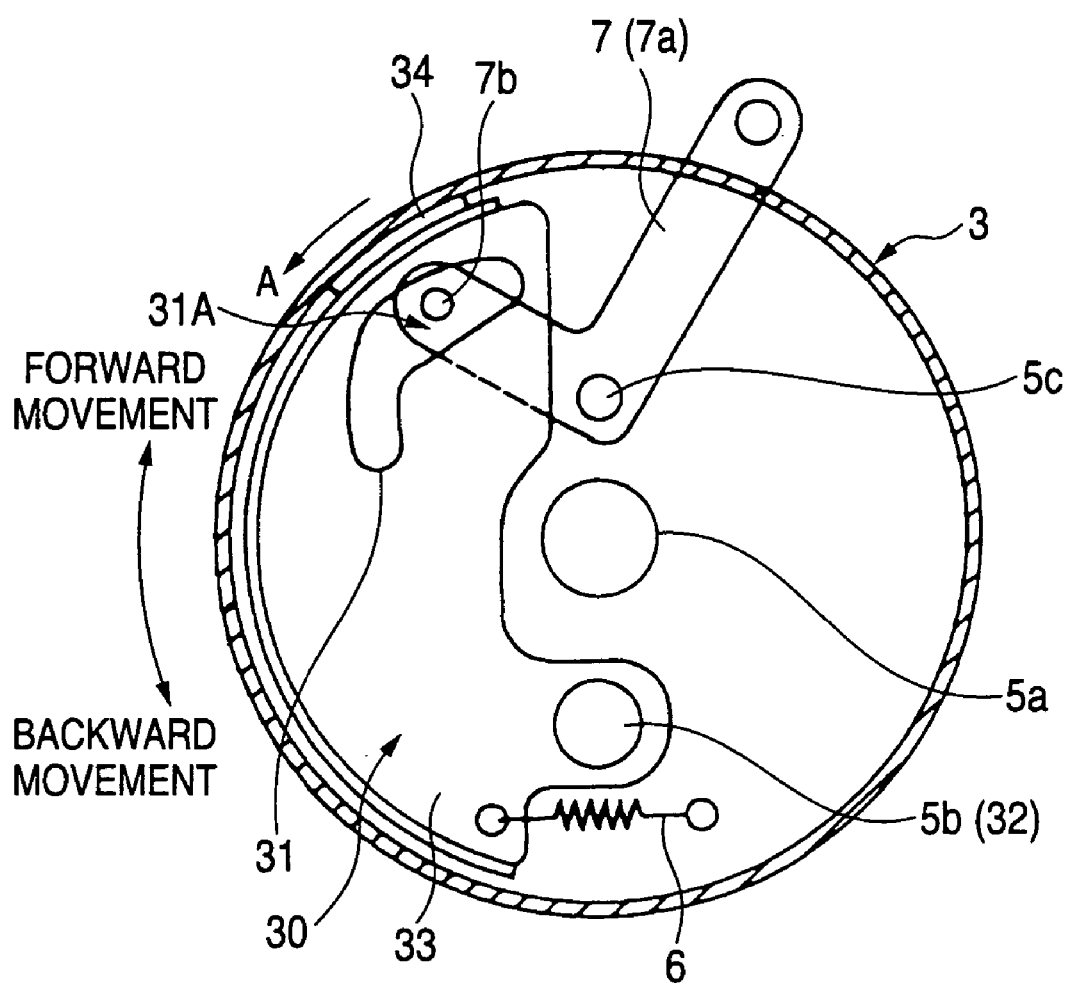
FIG. 3 is a drawing showing operations in an auxiliary brake mode of respective constituent parts of a brake apparatus according to a first embodiment.
Figure 4:
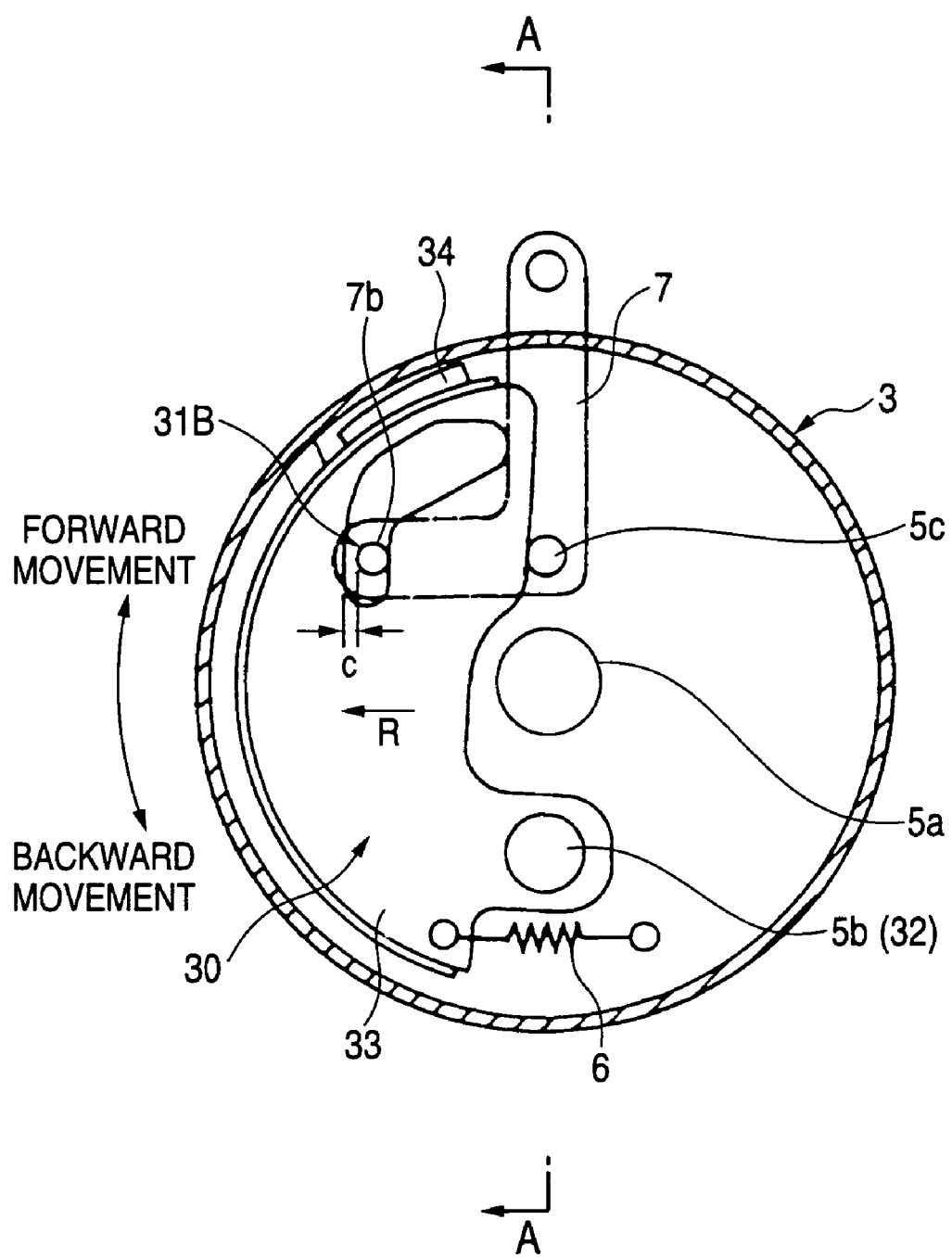
FIG. 4 is a drawing showing operations in a brake release mode of the respective constituent parts of the brake apparatus according to the first embodiment.
Figure 5:
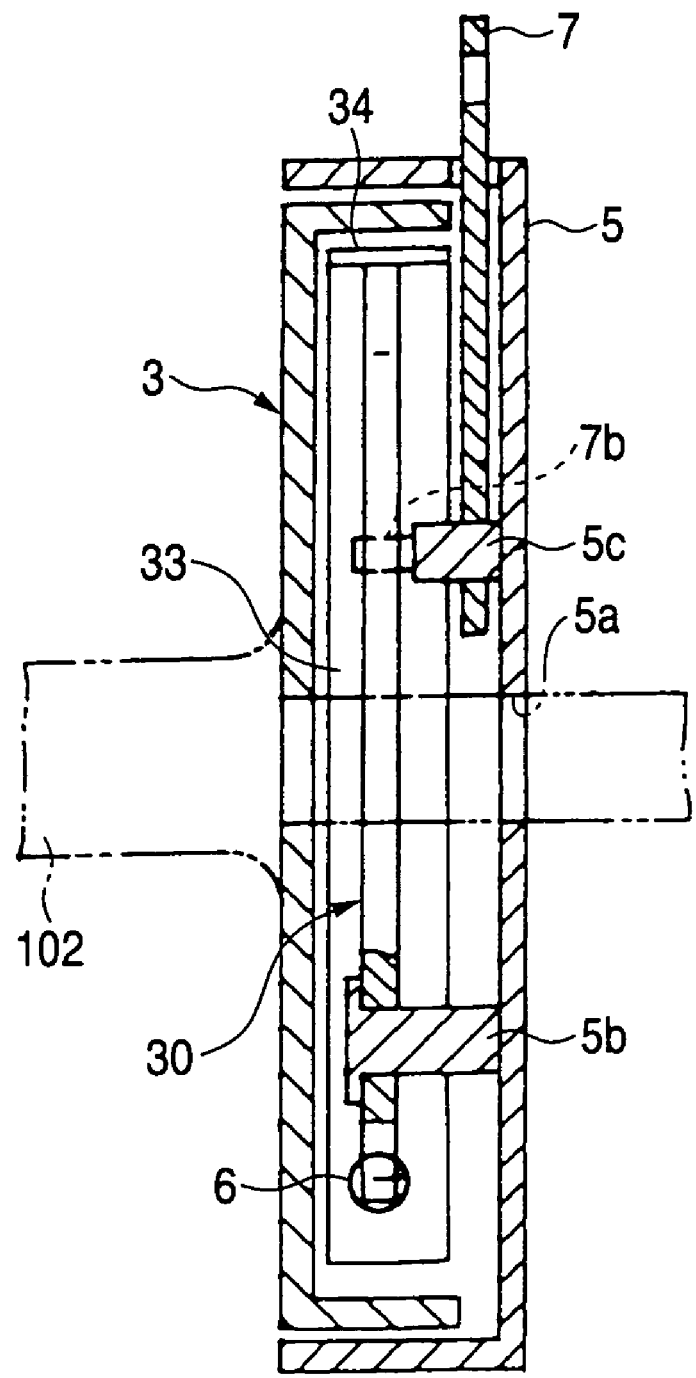
FIG. 5 is a sectional view taken along the line A–A' of the brake apparatus shown in FIG. 4.

A brake apparatus 1 shown in this embodiment is a brake apparatus which is generally referred to as a drum brake and includes, as shown in FIGS. 3 to 5, a brake drum 3 which rotates together with a wheel 101, a lock shoe 30 adapted for wedge engagement with an inner circumferential surface of the brake drum 3 when the brake drum 3 rotates backward to thereby generate a brake force, a back plate 5 for supporting the lock shoe 30 within the brake drum 3, a shoe spring 6 for bringing the lock shoe 30 into engagement with the inner circumferential surface of the brake drum 3 and a lock shoe restraining arm 7 for restraining the lock shoe 30 at a position which is spaced apart from the inner circumferential surface of the brake drum, and the brake apparatus 1 is equipped on each wheel 101 of the wheel chair 100.

Note that the brake apparatus 1 shown in FIGS. 3 and 4 is one installed in the right wheel 101 of the wheel chair 100, and in that installed state, a state in which the brake apparatus is viewed from a wheel side is shown. In addition, in FIGS. 3 and 4, for the sake of better understanding what is shown in the figures, the back plate 5 is omitted.

Figure 2:
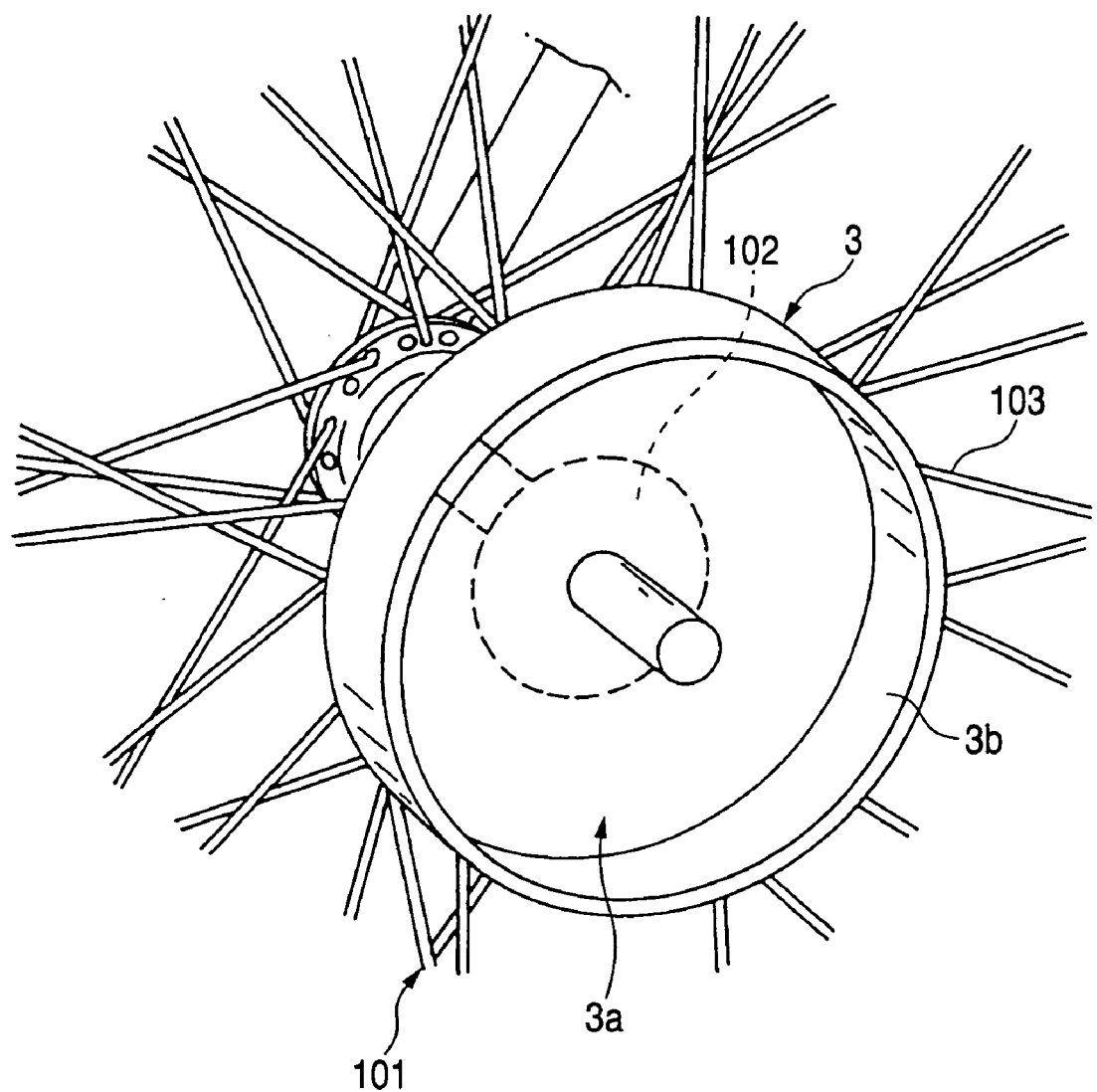
FIG. 2 is a perspective view showing a state in which a brake drum according to an embodiment of the invention is fixed to a wheel.

The brake drum 3 that is fixed to the wheel 101 is, as shown in FIG. 2, fixed to a hub 102 or spokes 103 extending radially from the hub 102, and is provided such that the rotational center thereof coincides with the rotational center of the wheel 101. To be more specific, the brake drum 3 includes a circular base plate portion 3a fixed to the hub 102 or the spokes 103 and a circumferential wall 3b which is extended toward a wheel chair 100 side from a circumferential edge of the base plate portion 3a in a state in which the brake drum 3 is installed in the wheel chair 100, and an inner circumferential surface of the circumferential wall 3b constitutes a contact surface (a friction surface) with the lock shoe 30.

Then, the back plate 5 is provided between a frame of the wheel chair 100 and the wheel 101 so that substantially all the main constituent parts which constitute the brake apparatus 1 are collected and disposed within the brake drum 3. The back plate 5 is a plate formed to have substantially the same diameter as that of the brake drum 3, and an edge portion thereof is bent toward a brake drum 3 side in such a manner as to cover the brake drum 3.

In addition, an axle pass-through hole 5a is provided in a center of the back plate 5, and when fixed to the wheel chair 100, the back plate 5 is fixed to the wheel chair 100 with an axle being passed through the axle pass-through hole 5a. In addition, an anchor pin 5b is fixedly provided on the back plate 5 below the axle pass-through hole 5a. The lock shoe 30 is rotatably supported inwardly of the brake drum 3 via this anchor pin 5b which is a fixing shaft.

Additionally, an arm support shaft 5c constituting a rotational center of the lock shoe restraining arm 7 is fixedly provided on the back plate 5 above the axle pass-through hole 5a.

Note that when used herein, below the axle pass-through hole 5a means downward in FIGS. 3 and 4, and this direction appropriately changes depending on how the brake apparatus 1 is installed in the wheel chair 100. In addition, when described as below and above in the following description, they mean upward and downward based on the drawings, and the directions appropriately change depending on how the brake apparatus 1 is installed in the wheel chair 100.

The lock shoe 30 is such as to function as a brake means for imposing a restriction on the rotation of the brake drum 3 by being brought into wedge engagement with the inner circumferential surface of the brake drum 3 and is constituted by a semi-circular shoe main body 33 having at one end a guide groove 31 adapted for engagement with the lock shoe restraining arm 7 and at the other end thereof a fixing hole 32 which constitutes a rotational center of the lock shoe 30 and a lining 34 (a friction member) provided on a contact surface of the shoe main body 33 with the inner circumferential surface 3b of the brake drum. In addition, the lock shoe 30 is rotatably mounted on the anchor pin 5b provided at a lower portion of the back plate 5 via the fixing hole 32. Namely, the lock shoe 30 comes to have a rotational center thereof at a position which is deviated from the center of the back plate 5.

Then, a shoe spring 6 is provided below the anchor pin 5b in such a manner as to connect the lock shoe 30 with the back plate 5. As shown in FIG. 3, the shoe spring 6 is a pull coil spring which is connected to a lower portion of the shoe main body 33 at one end and to the back plate 5 at the other end thereof and biases the lining 34 of the lock shoe 30 in such a manner as to be pressed against the brake drum inner circumferential surface 3b in a normal state. Note that when used herein the normal state means a state in which no external force is being applied to the lock shoe 30.

As shown in FIG. 3, the lock shoe restraining arm 7, which is supported together with the lock shoe 30 within the brake drum 3, has a lever main body 7a having a reversed L-shape which is rotatably provided on the arm support shaft 5c which is provided on the back plate 5 and a guide pin 7b which is provided at one end of the lever main body 7a and is passed through the guide groove 31 in the lock shoe 30, and is connected at the other end thereof to a mode selection lever, not shown.

On the other hand, the guide groove 31 through which the guide pin 7b is passed has, as shown in FIG. 3, a lock shoe releasing position 31A where a contact state of the lock shoe 30 with the brake drum 3 is maintained and a lock shoe restraining position 31B where the lock shoe 30 is restrained (held) at a position which is spaced apart from the brake drum inner circumferential wall 3b through engagement with the guide pin 7b, and by rotating the lock shoe restraining arm 7 with the mode selection lever, not shown, the lock shoe 30 is positioned relative to the brake drum inner circumferential wall 3b.

Note that the mode selection lever and the lock shoe restraining arm 7 maybe connected using a wire or maybe connected to each other via a link mechanism. Namely, as long as the lock shoe restraining arm 7 can be rotated, no particular configuration and mechanism are required. In addition, a construction may be adopted in which the lever main body 7a is extended to a position where it can simply be operated by the user so that the lock shoe restraining arm 7 is directly rotated.

The aforesaid mode selection lever is such as to function as a brake force selecting means for selectively change over the operation of the lock shoe 30 either to an auxiliary brake mode or to a brake release mode which will both be described later on.

A method for operating the brake apparatus will be described below in consideration of operations of the respective constituent parts. Note that FIG. 3 is a drawing for explaining operations of the respective constituent parts when the brake is applied by the lock shoe 30, or in an auxiliary brake mode. In addition, FIG. 4 is a drawing for explaining operations of the respective constituent parts when the brake is released or in a brake release mode.

(Auxiliary Brake Mode)

An auxiliary brake mode is a mode which is preferably applied to a running condition where the wheel chair 100 moves backward such as when the wheel chair 100 is started from rest on a slope and is kept climbing the slope, and is attained by rotating the lock shoe restraining arm 7 so that the positional relationship between the guide groove 31 and the guide pin 7b constitutes the lock shoe releasing position 31A shown in FIG. 3.

In a case where the positional relationship between the lock shoe 30 and the guide pin 7b constitutes the lock shoe releasing position 31A, gaps are formed in a transverse direction between the guide groove 31 and the guide pin 7b, and the lock shoe 30 can rotate around the anchor pin 5b functioning as a rotational center without being subjected to restriction by the guide pin 7b. In addition, in this state, the lock shoe 30 is maintained by a tension of the shoe spring 6 in a contact state with the inner circumferential wall 3b of the brake drum 3.

Then, in the contact state between the lock shoe 30 and the brake drum inner circumferential surface 3b, when a condition is reached where the brake drum 3 rotates backward, a self-energizing effect (a wedge effect) is generated between the lock shoe 30 and the brake drum inner circumferential surface 3b, whereby the brake is applied to the wheel 101.

Note that the self-energizing effect means a phenomenon in which a lining 34 (the lock shoe 30) having a rotational center thereof at a position which is deviated from the rotational center of the brake drum 3 and pressed against the inner circumferential surface 3b of the brake drum 3 by means of the shoe spring 6 is dragged in an A direction in the figure by virtue of rotation of the brake drum 3 to thereby generate a brake force between the inner circumferential surface 3b of the brake drum 3 and itself.

Namely, in the lock shoe 30 having the rotational center thereof at the position which is deviated from the center of the brake drum 3, as the brake drum 3 rotates, the shoe main body 33 which supports the lining 34 extends between the anchor pin 5b and the lining 34, whereby a strong pressing force is applied to the lining 34. Consequently, the brake drum 3 and the lining 34 are constructed so as to be brought into a wedge engagement (a state in which the lining 34 is strongly pressed against the inner circumferential surface 3b of the brake drum 3) with each other, whereby the brake is applied.

Thus, when the lock shoe restraining arm is rotated to the position where the auxiliary brake mode is attained, when attempting to climb a slope, the user of the wheel chair 100 can move forward without paying attention to a risk of being forced to move backward.

In addition, in a case where the wheel 101 rotates forward in the auxiliary brake mode, while the contact state between the lock shoe 30 and the brake drum inner circumferential surface 3b is still maintained, since the aforesaid self-energizing effect provides no effect, no brake is applied to the wheel 101. Additionally, since the tension of the shoe spring 6 is only such a tension as to maintain the contact state between the lock shoe 30 and the brake drum 3, a friction force acting between the lock shoe 30 and the brake drum 3 is very small and there is sensed no problem with the rotation of the wheel 101.

(Brake Release Mode)

To follow, a brake release mode will be described.

A brake mode is a mode where forward and backward movements of the wheel chair 100 are made free, and is attained by operating the mode selection lever, not shown, so that the positional relationship between the guide groove 31 and the guide pin 7b constitutes the lock shoe restraining position 31B shown in FIG. 4.

In a case where the positional relationship between the lock shoe 30 and the guide pin 7b constitutes the lock shoe 30 restraining position shown in FIG. 4, the guide pin 7b is in a contact state with a circumferential edge of the guide groove 31, and the lock shoe 30 is subjected to a restriction by the guide pin 7b to thereby be supported at a position which is spaced apart from the brake drum 3 inner circumferential wall. Note that while a slight gap C is formed to the left of the guide pin 7b at the lock shoe restraining position 31B, since the lock shoe 30 is biased by the shoe spring 6 in an R direction in the figure, the restrained state of the lock shoe 30 is also maintained in this state.

Consequently, in the brake release mode, a gap is formed between the lining 34 provided on the lock shoe 30 and the inner circumferential surface 3b of the brake drum 3, and thus, no brake is applied to the wheel 101 both when the brake drum 3 rotates forward and when the brake drum 3 rotates backward. Consequently, the wheel chair 100 is allowed to move forward and backward.

Thus, according to the first embodiment of the invention, since the lock shoe 30 which exhibits the brake force when the brake drum 3 rotates backward is installed in the brake drum 3, the wheel chair 100 is allowed to move forward without being forced to move backward even when the wheel chair is started from rest on a slope and is kept climbing the slope. In addition, since the existence and non-existence of brake force applied to the wheel 101 can arbitrarily be selected by rotating the lock shoe restraining arm 7, the wheel chair is allowed to move backward when required.

Furthermore, since almost all the constituent parts which constitute the brake apparatus 1 are incorporated within the brake drum 3, the brake apparatus 1 can be fabricated small in size and light in weight. In addition, the friction surface which exhibits a brake force is constituted by the inner circumferential surface 3*b* of the brake drum 3, a stable brake force can be obtained at all times even in conditions where the wheel chair 100 is run in the rain and where the air pressure of the wheel (tire) is reduced.

In the first embodiment that has been described heretofore, while the brake apparatus has been described which is provided with the slope climbing brake which exhibits brake force when the brake drum 3 rotates backward, in the invention according to the present patent application, a construction can be adopted in which in addition to the slope climbing brake, a parking brake is provided. Note that the parking brake means a brake for stopping the wheel chair 100 on an inclined ground in an ensured fashion.

[Second Embodiment]

FIGS. 6 to 9 show a second embodiment of a brake apparatus according to the invention.

A brake apparatus 11 according to this second embodiment including a slope climbing brake and a parking brake, in a state of installed in the right wheel of the aforesaid wheel chair 100, is shown in which the brake apparatus 11 is viewed from the wheel side.

In addition, for the sake of better understanding what is in the figures, a back plate 5 is omitted.

Additionally, since the basic construction of the brake apparatus 11 of the second embodiment follows the basic construction of the brake apparatus 1 of the first embodiment, a description will be made by same reference numbers to substantially same portions.

Figure 6:
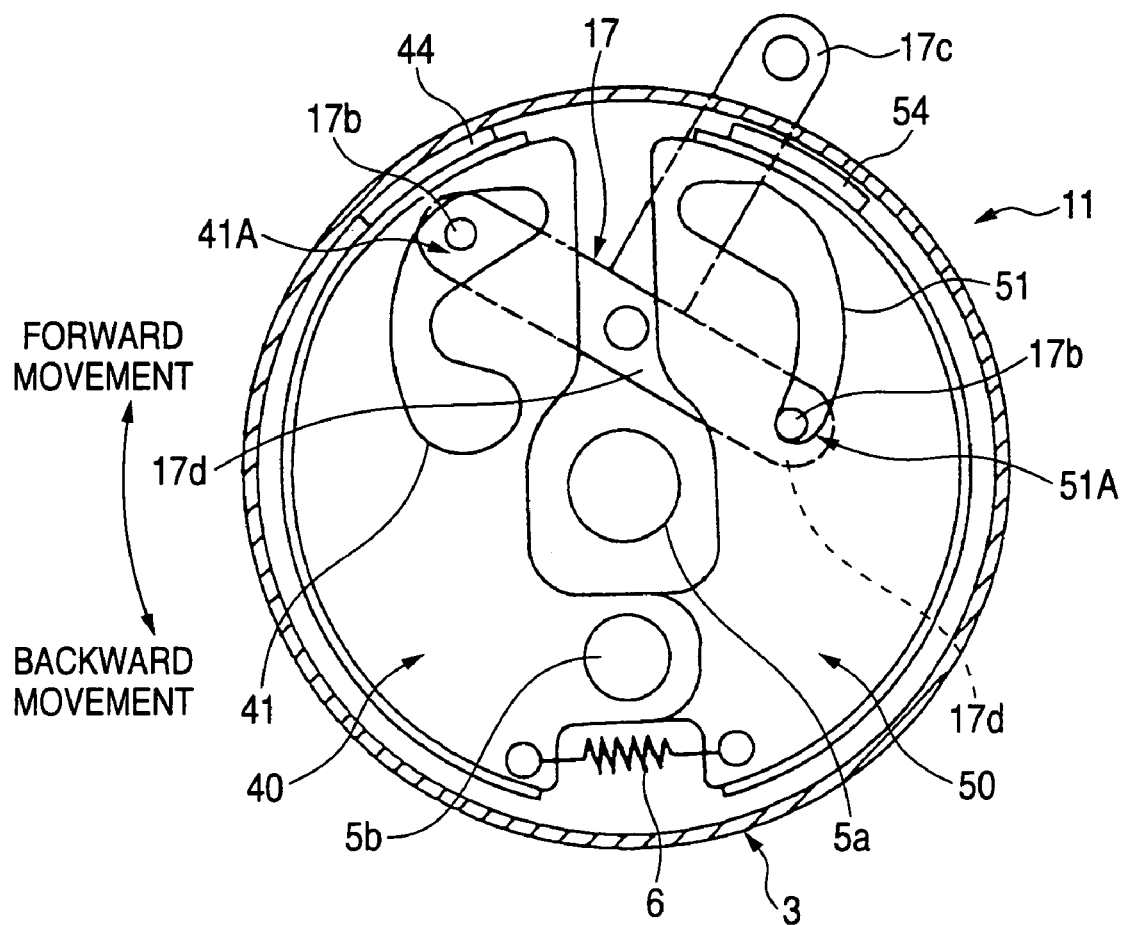
FIG. 6 is a drawing showing operations in an auxiliary brake mode of respective constituent parts of a brake apparatus according to a second embodiment.

As shown in FIG. 6, the brake apparatus 11 provided with the parking brake in addition to the slope climbing brake is constructed so as to have a backward rotation lock shoe 40 which exhibits a brake force when a brake drum 3 rotates backward, a forward rotation lock shoe 50 which is provided rotatably on an anchor pin 5*b* in such a manner as to confront the backward rotation lock shoe 40 and which exhibits a brake force when the brake drum 3 rotates forward, and a lock shoe restraining arm 17 which restrains individually the backward rotation lock shoe 40 and the forward rotation lock shoe 50 at a position which is spaced apart from a brake drum inner circumferential surface 3*b*, respectively.

Then, the brake apparatus 11 can be changed over by operating the lock shoe restraining arm 17 to an auxiliary brake mode in which a brake is applied only when the wheel chair 100 moves backward, a brake lock mode in which a brake is applied in both directions in which the wheel chair 100 moves forward and backward, and a brake release mode in which no brake is applied either when the wheel chair 100 moves forward or when the wheel chair 100 moves backward.

Namely, in the brake apparatus 11 shown in the second embodiment, the two lock shoes 40, 50 are provided within the brake drum 3, so that a restriction is imposed on the backward rotation of the wheel 101 by means of the backward rotation lock shoe when climbing the slope, whereas when parked, a restriction is imposed on the forward and backward two directional rotations of the wheel 101 by means of the forward rotation lock shoe 50 and the backward rotation lock shoe 40.

Firstly, the backward rotation lock shoe 40 will be described. The backward rotation lock shoe 40 adopted in the second embodiment has substantially the same function and construction as those of the lock shoe 30 shown in the first embodiment and exhibits a brake force resulting from the self-energizing effect when the brake drum 3 rotates backward. Note that a difference in construction from the lock shoe 30 described in the first embodiment resides in a different configuration of a guide groove 41.

Figure 7:
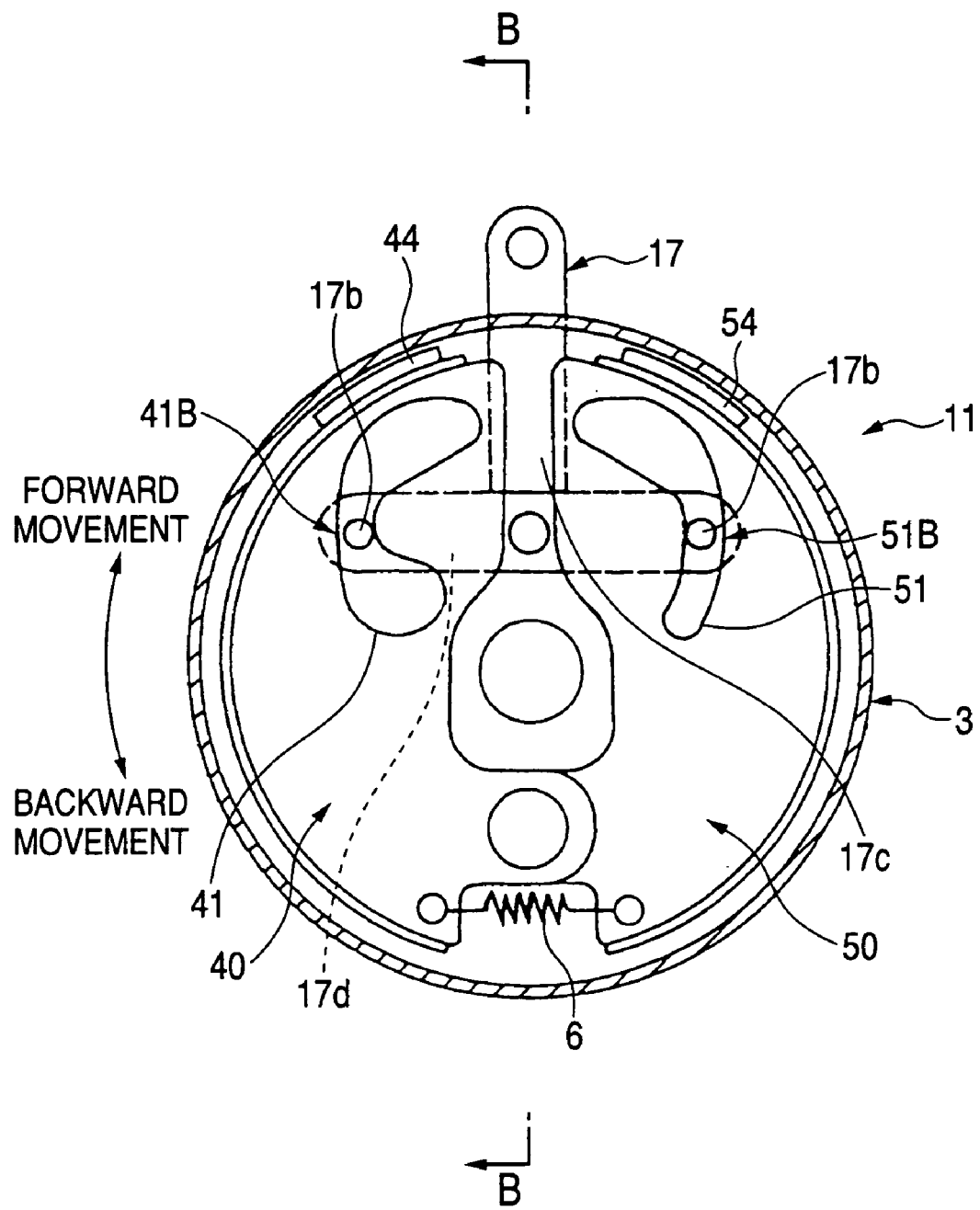
FIG. 7 is a drawing showing operations in a brake release mode of the respective constituent parts of the brake apparatus according to the second embodiment.
Figure 8:
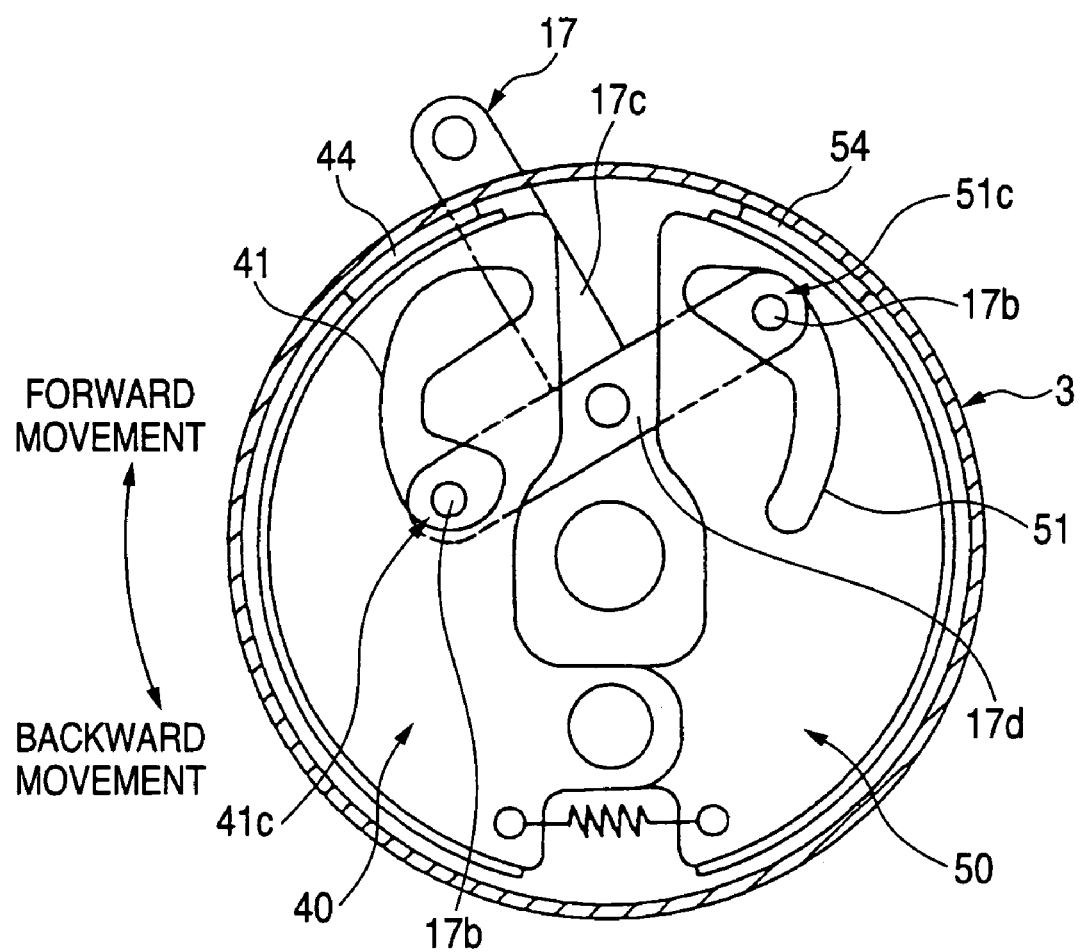
FIG. 8 is a drawing showing operations in a brake lock mode of the respective constituent parts of the brake apparatus according to the second embodiment.
Figure 9:
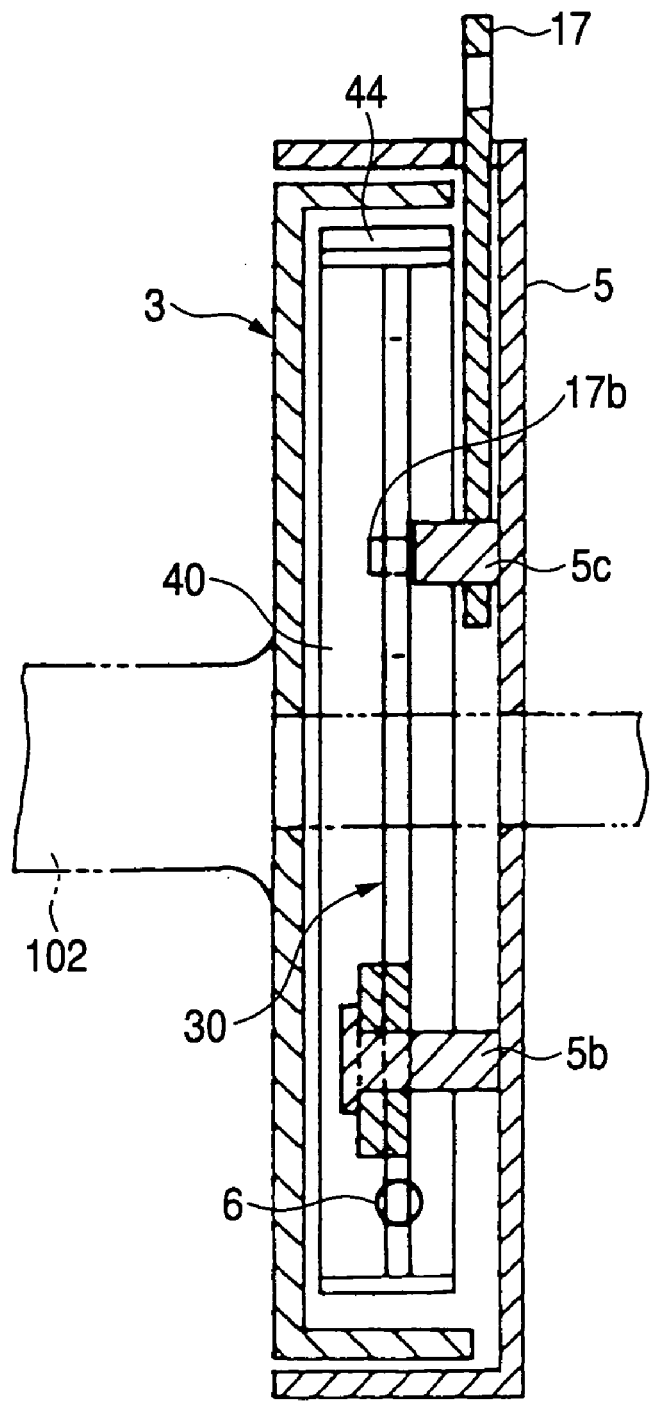
FIG. 9 is a sectional view taken along the line A–A' of the brake apparatus shown in FIG. 7.

The guide groove 41 provided in the backward rotation lock shoe 40 has a first releasing position 41A, as shown in FIG. 6, where a guide pin 17*b* is positioned apart from a circumferential edge of the guide groove so that a contact state between the backward rotation lock shoe 40 and the brake drum inner circumferential surface 3*b* is maintained, a restraining position 41B, as shown in FIG. 7, where the guide pin 17*b* contacts a circumferential edge of the guide groove 41 so that the backward rotation lock shoe 40 is restrained (held) in such a manner as to be spaced apart from the brake drum inner circumferential surface 3*b*, and a second releasing position 41C, as shown in FIG. 8, where as with the first releasing position 41A, the contact state between the brake drum 3 and the backward lock shoe 40 is maintained, and positioning of the backward rotation lock shoe 40 relative to the brake drum inner circumferential surface 3*b* can be implemented by operating the lock shoe restraining arm 17. Note that correspondence with the lock shoe restraining arm 17 will be described in detail later on.

On the other hand, as in the case with the backward rotation lock shoe 40, the forward rotation lock shoe 50 also has substantially the same construction and function as those of the lock shoe 30 illustrated in the first embodiment. However, since the positional relationship with the backward rotation lock shoe 40 is reversed, a direction in which the self-energizing effect is applied becomes opposite. Namely, when the brake drum 3 rotates forward, a self-energizing effect is exhibited between the brake drum 3 and itself, and a brake force is provided in a forward rotating direction of the wheel 101. In addition, similarly with the backward rotation lock shoe 40, a guide groove 51 thereof has a different configuration from that of the lock shoe 30 illustrated in the aforesaid first embodiment.

Note that the shoe spring 6 provided to connect the lock shoe 30 with the back plate 5 in the aforesaid first embodiment is now provided to connect the backward rotation lock shoe 40 with the forward rotation lock shoe 50 in this embodiment. Consequently, the respective lock shoes 40, 50 are expanded outwardly around the anchor pin 5*b* as a common rotational center, and in a state in which the respective lock shoes 40, 50 contact the brake drum 3, a self-energizing effect is exhibited correspondingly with the rotational direction of the brake drum 3 when it rotates.

The guide groove 51 in the forward rotation lock shoe 50 has a first restraining position 51A, as shown in FIG. 6, where the forward rotation lock shoe 50 is restrained at a position which is spaced apart from the brake drum 3 inner circumferential surface when the positional relationship between the guide groove 41 and the guide pin 17*b* on the backward rotation lock shoe 4 constitutes the first releasing position 41A, a second restraining position 51B, as shown in FIG. 7, where the forward rotation lock shoe 50 is restrained at the position which is spaced apart from the brake drum 3 inner circumferential surface when the positional relationship between the guide groove 41 and the guide pin 17*b* on the backward rotation lock shoe 4 constitutes the restraining position 41B., and a releasing position 51C, as shown in FIG. 8, where a contact state of the forward rotation lock shoe 50 with the brake drum 3 is maintained when the positional relationship between the guide groove 41 and the guide pin 17b on the backward rotation lock shoe 4 constitutes the second releasing position 41C, and positioning of the forward rotation lock shoe relative to the brake drum inner circumferential surface 3b can be implemented by operating the lock shoe restraining arm 17.

Note that the lock shoe restraining arm 17 which can position the respective lock shoes 40, 50, individually has at ends thereof a pair of guide pins 17b, 17b which are passed through the guide grooves 41, 51 of the respective lock shoes 40, 50, and has further at a central portion thereof a restraining arm main body 17d which is rotatably supported on the back plate 5 and an operating lever 17c which swings the restraining arm main body 17d around the arm support shaft 5c as a rotational center.

Consequently, the correspondence between the guide grooves 41, 51 in the respective lock shoes 40, 50 and the lock shoe restraining arm 17 is such that the first releasing position 41A of the backward rotation lock shoe 40 corresponds with the first restraining position 51A of the forward rotation lock shoe 50 across the arm support shaft 5c function as a center (an auxiliary brake mode), the restraining position 41B of the backward rotation lock shoe 40 corresponds with the second restraining position 51B of the forward rotation lock shoe 50 (a brake release mode), and the second releasing position 41C of the backward rotation lock shoe 40 corresponds with the releasing position 51C of the forward rotation lock shoe 50 (a brake lock mode).

Then, by operating the lock shoe restraining arm 17, the brake apparatus 11 can be changed over to the respective modes. Hereinafter, brake operations in the aforesaid respective modes will be described in consideration of movements of the respective constituent parts.

Note that FIG. 6 is a drawing for explaining the movements of the respective constituent parts in the auxiliary brake mode. FIG. 7 is a drawing for explaining the movements of the respective constituent parts in the brake release mode. FIG. 8 is a drawing for explaining the movements of the respective constituent parts in the brake lock mode.

(Auxiliary Brake Mode)

The auxiliary brake mode illustrated in the second embodiment is a mode which is preferably applied to a running condition where the wheel chair 100 moves backward such as when the wheel chair 11 is caused to climb a slope and is started from rest on the slope similarly with the first embodiment. When selecting this auxiliary brake mode, such a selection can be implemented by operating the lock shoe restraining arm 17 so that the correspondence between the respective guide grooves 41, 51 and the lock shoe restraining arm 17 is such that the first releasing position 41A is constituted in the backward rotation lock shoe 40 and the first restraining position 51A is constituted in the forward rotation lock shoe 50.

Consequently, in the auxiliary brake mode, only the backward rotation lock shoe 40 is brought into contact with the inner circumferential surface 3b of the brake drum 3. Due to this, when the brake drum 3 rotates backward, or when the wheel chair 100 moves backward, the brake force resulting from the self-energizing effect is constructed to be applied to the wheel 101.

(Brake Release Mode)

The brake release mode illustrated in the second embodiment is a mode in which the wheel chair 100 is made free to move forward and backward as with the first embodiment. When selecting this brake release mode, such a selection can be implemented by operating the lock shoe restraining arm 17 so that the correspondence between the respective guide grooves 41, 51 and the lock shoe restraining arm 17 is such that the restraining position 41B is constituted in the backward rotation lock shoe 40 and the second restraining position 51B is constituted in the forward rotation lock shoe 50.

Consequently, since the backward rotation lock shoe 40 and the forward rotation lock shoe 50 are supported at the positions which are spaced apart from the inner circumferential surface 3b of the brake drum 3, even when the brake drum 3 rotates backward and forward, the brake force resulting from the self-energizing effect is not applied to the wheel 101. Consequently, the wheel chair 100 is allowed to move forward and backward.

(Brake Lock Mode)

The brake lock mode is a mode which is preferably applied to a case where the wheel chair 100 is stopped in an ensured fashion on inclined and flat grounds. When selecting this brake lock mode, such a selection can be implemented by operating the lock shoe restraining arm 17 so that the correspondence between the respective guide grooves 41, 51 and the lock shoe restraining arm 17 is such that the second releasing position 41C is constituted in the backward rotation lock shoe 40 and the releasing position 51C is constituted in the forward rotation lock shoe 50.

Consequently, in the brake lock mode, since both the backward rotation lock shoe 40 and the forward rotation lock shoe 50 are brought into contact with the brake drum inner circumferential surface 3b, the brake force resulting from the self-energizing effect is applied to the wheel 101 in both directions in which the brake drum 3 rotates backward and forward. Namely, the wheel chair 100 is put in a parked state where the wheel chair 100 is not allowed to move in either of the directions in which it moves forward and backward.

Thus, according to the second embodiment of the invention, slope starting and slope climbing can easily be implemented by selecting the auxiliary brake mode, and the parked state can securely be maintained irrespective of being parked on an inclined ground or a flat ground by selecting the brake lock mode. In addition, the movement of the wheel chair 100 is made free by selecting the brake release mode.

Furthermore, since almost all the constituent ports constituting the brake apparatus 11 are incorporated within the brake drum 3, the brake apparatus can be made smaller in size and lighter in weight. In addition, since the friction surface where the brake force is exhibited is constituted by the inner circumferential surface 3b of the brake drum 3, a stable brake force can be obtained even under conditions where the wheel chair 100 is run in the rain and where the air pressure of the wheel (tire) is reduced.

Note that while the auxiliary brake mode serves as the slope climbing brake in the respective embodiments, the auxiliary brake may be constructed so as to exhibit a brake force when the wheel chair moves forward. In a case where the auxiliary brake is constructed so as to exhibit a brake force when the wheel chair moves forward, this can be realized by transversely reversing the disposition off the lock shoe and the lock shoe restraining arm relative to the anchor pin. As a condition where a brake is required when moving forward, for example, a case can be anticipated where the wheel chair is moved backward so to climb the inclined ground. Note that as an advantage of climbing the inclined ground with the wheel chair being moved backward, a point may be raised that in the event that there are irregularities on the road surface, climbing will be easier when the wheel chair is moved with larger wheels which constitute drive wheels being oriented toward the advancing direction.

Figure 10:
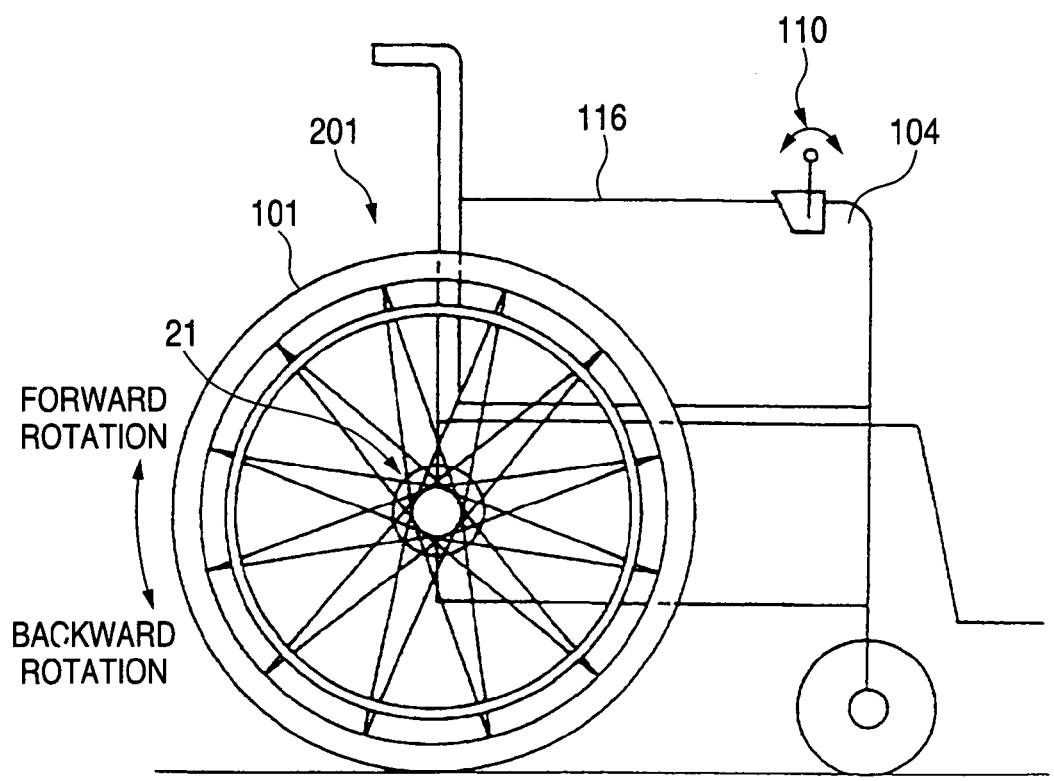
FIG. 10 is a side view of the wheel chair to which a brake apparatus according to a third embodiment of the invention is applied.

FIGS. 10 to 18 show a third embodiment of a brake apparatus according to the invention, and FIG. 10 shows a wheel chair 201 to which a brake apparatus 21 according to the third embodiment of the invention is applied.

This brake apparatus 21 of the third embodiment is also a brake apparatus of a kind which is generally referred to as a drum brake, and includes a brake drum 3 which rotates together with a wheel 101, a brake shoe 22 adapted for contact with an inner circumferential surface of the brake drum 3 and a back plate 25 which supports the brake shoe 22 within the brake drum 3, the brake apparatus being provided on each of wheels of the wheel chair 201.

The brake drum 3 provided on the wheel 101 is, as shown in FIG. 2, fixed to a hub 102 which becomes a rotational center of the wheel 101 or spokes 103 which extend radially from the hub 102, and is provided in such a manner that a rotational center thereof coincides with a rotational center of the wheel 101. To be specific, the brake drum 3 includes a circular base plate portion 3a which is fixed to the hub 102 or the spokes 103, and a circumferential wall 3b which is extended toward a wheel chair 201 side from a circumferential edge of the base plate portion 3a in a state in which the brake drum 3 is installed in the wheel chair 201, and an inner circumferential surface of the circumferential wall 3b constitutes a contact surface with the brake shoe 22.

Then, the back plate 25 is provided between a frame of the wheel chair 201 and the wheel 101 so that almost all the main constituent parts which constitute the brake apparatus 21 are disposed inwardly of the brake drum 3. Note that an axle pass-through hole 25a is provided in a center of the back plate 25, and when the back plate 25 is mounted, the back plate 25 is fixed to the frame with an axle (a rotational shaft) of the wheel being passed through and mounted therein.

Raised as the main constituent parts which are provided on the back plate 25 are a pair of brake shoes 22, 22 adapted for contact with the inner circumferential surface 3b of the brake drum 3 so as to restrict the rotation of the brake drum 3 in both directions in which the brake drum 3 rotates forward and backward, a lock shoe 26 adapted for contact with the inner circumferential surface 3b of the brake drum 3 so as to restrict the rotation of the brake drum 3 in the backward direction when the brake drum 3 rotates backward, a lock shoe restraining arm 27 for restraining the lock shoe 26 at a position which is spaced apart from the inner circumferential surface 3b of the brake drum 3, an actuation cam 28 for pressing the pair of brake shoes 22 against the brake drum inner circumferential surface 3b and releasing the restraint of the lock shoe 26 by the lock shoe 6 restraining arm 27 so as allow a brake force by the lock shoe 26 to work, and various types of springs 61, 62, 63 which bias the aforesaid various types of parts toward desired directions.

Figure 13:
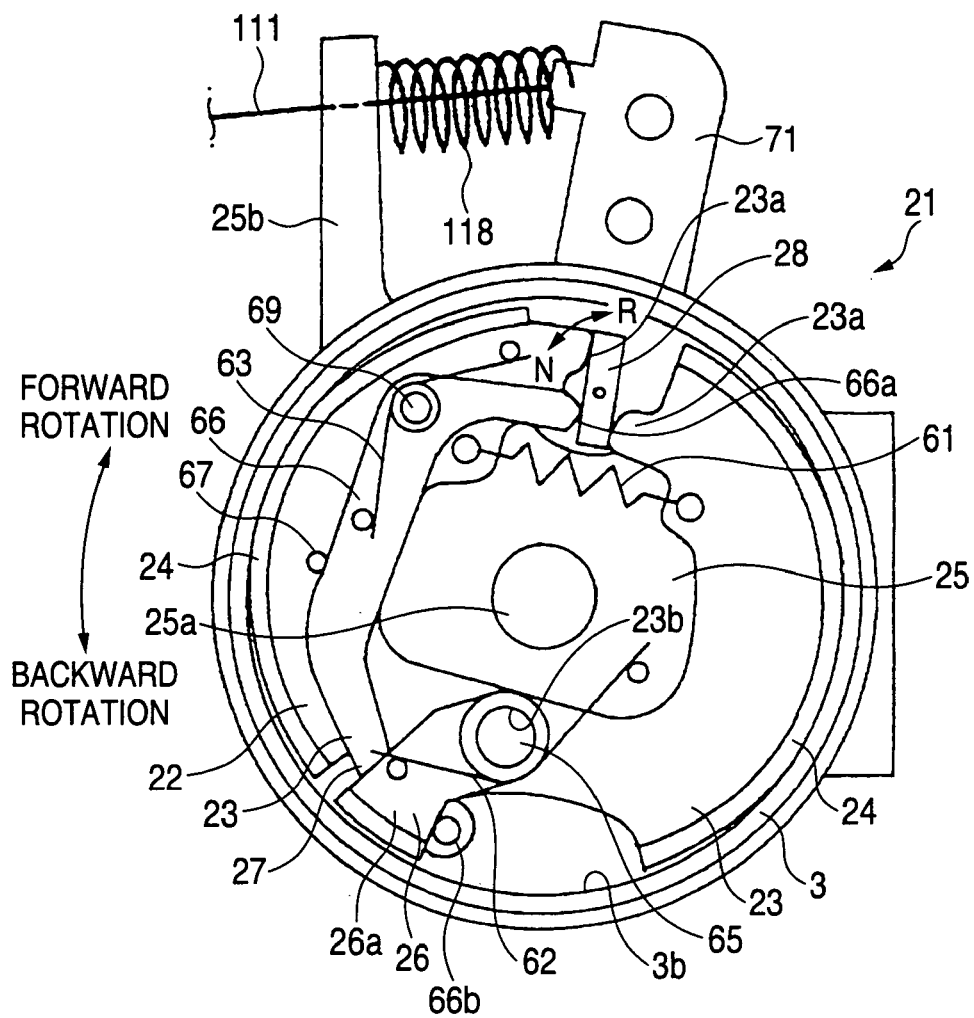
FIG. 13 is an explanatory drawing of operations in a main brake mode of respective constituent parts of the brake apparatus according to the third embodiment of the invention.

As shown in FIG. 13, the pair of lock shoes 22, 22 each have a contact point 23a with the actuation cam 28 at one end thereof and include at the other end a shoe main body 23 formed into a segment and having a fixing hole 23b which functions as a rotational center of the brake shoes 22 and a lining 24 provided on a contact surface of the shoe main body 23 with the brake drum inner circumferential surface 3b, and the respective brake shoes 22 are rotatably provided on an anchor pin 65 provided closer to a lower portion of the back plate 25 via the fixing hole 23b.

Namely, the respective brake shoes 22 are connected to each other via the anchor pin 65, and function as a first brake means for restricting the rotation of the brake drum 3 relative to rotations in the both directions when the actuation cam 28 rotates with the respective linings 24 being pressed against the brake drum inner circumferential surface 3b with the contact portions 23a functioning as a point for force and the anchor pin 65 functioning as a fulcrum to thereby generate a brake force.

Note that the respective brake shoes 22 are connected by a spring 61 at free ends thereof which confront each other, and in a normal state, the respective shoes 22 are held at a position which is spaced apart from the brake drum inner circumferential surface 3b. Note that when used herein, the normal state means a state in which no external force is being applied to the brake shoes 22.

On the other hand, as shown in FIG. 13, the lock shoe 26 which exhibits a brake force when the brake drum 3 rotates backward has a lock shoe main body 26a extending from the anchor pin 65 toward the brake drum inner circumferential surface 3b, a lock lining 26b fitted to a distal end of the lock shoe main body 26a so as to constitute a contact surface with the brake drum inner circumferential surface 3b, and a lock shoe spring 62 which biases the lock shoe 26 in such a manner as to be brought into contact with the inner circumferential surface 3b of the brake drum 3 in a normal state.

Note that the lock shoe main body 26a is provided rotatably relative to the anchor pin 65, and the overall length thereof is formed to be slightly longer than a shortest distance between the anchor pin 65 and the brake drum 3. Due to this, the lock shoe 26 is slightly offset closer to the forward rotating direction than a normal line extending from the brake drum 3 to reach the anchor pin 65 to thereby generate a self-energizing effect (a wedge effect) between the lock shoe 26 and the brake drum 3 when the brake drum 3 rotates backward, and thus functions as a second brake means for forcibly restricting the rotation of the brake drum 3 in the backward direction.

Note that the lock shoe 2 is normally restrained by the lock shoe restraining arm 27 at a position which is spaced apart from the brake drum inner circumferential surface 3b.

The lock shoe restraining arm 27 has, as is shown in FIG. 13, a contact portion 66a adapted for contact with the actuation cam 28 at one end and at the other end an arm main body 66 formed substantially into an L-shape which has a lock shoe support pin 66b adapted for contact with the lock shoe 26 for supporting the same lock shoe 26, a lock shoe restraining spring 63 for biasing the arm main body 66 so that the lock shoe 26 is supported at the position which is spaced apart from the brake drum inner circumferential surface 3b, and a lock shoe restraining pin 67 for positioning the arm main body 66 which is biased by the lock shoe restraining spring 63.

Then, the arm main body 66 is rotatably provided on a lock shoe restraining arm anchor pin 69 which is provided closer to an upper portion of the back plate 25. Note that operations of the brake shoes 22, the lock shoe 26 and the lock shoe restraining arm 27 will be described in detail later on.

The brake shoes 22 and the actuation cam 28 adapted for contact with the lock shoe restraining arm 27 are each formed into a rectangular plate-like shape, and are connected with an operating lever 71 provided on a back of the back plate 25 in such a manner as to freely swing at an upper portion of the back plate 25. Namely, the actuation cam 28 is constructed to also rotate in conjunction with the movement of the operating lever 71 when the operating lever 71 is swung.

Figure 11:
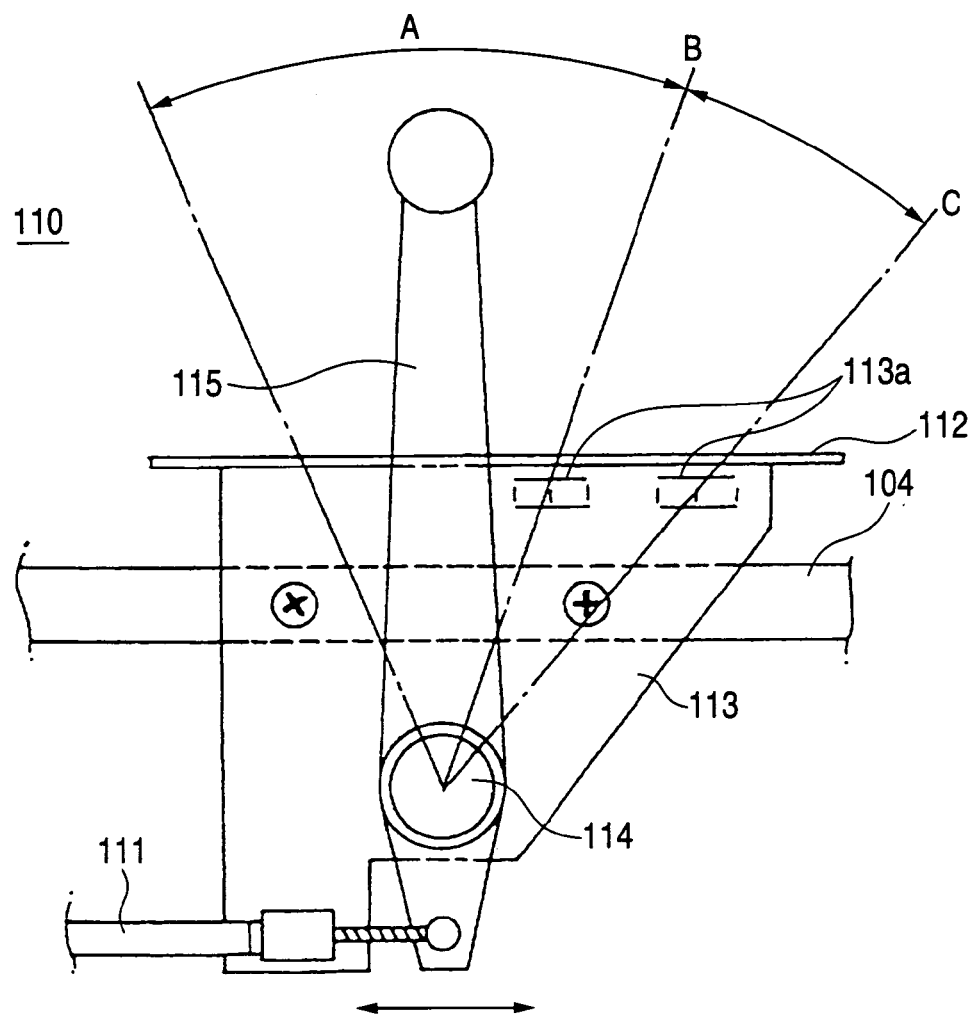
FIG. 11 is an enlarged side view of a brake lever shown in FIG. 10 which functions as a mode selection means.

On the other hand, as shown in FIGS. 10 and 11, an end portion of the operating lever 71 is connected with a brake lever 110 provided on the frame 104 of the wheel chair 201 via a wire 111, whereby the operating lever 71 is constructed to be swung through interlock with the operation of the brake lever 110 when the brake lever is operated. Namely, there is provided a construction in which the actuation cam 28 is rotated through the operation of the brake lever 110.

In addition, the brake lever 110 includes, as shown in FIG. 11, a base plate 112 which is fixed to the frame 104 of the wheel chair 201, a brake lever support bracket 113 extending downward of the base plate 112, a brake lever support pin 114 provided on the brake lever support bracket 113, and a lever main body 115 provide rotatably on the brake lever support pin 114.

Note that while a mounting position of the brake lever 110 to the frame 114 is arbitrary, as shown in FIG. 10, the brake lever 11 may be provided preferably on a hand rail portion 116 of the wheel chair 201 which provides an easy operation by the user.

Figure 12:
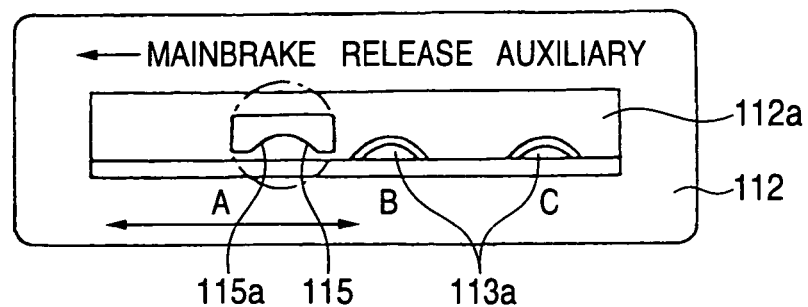
FIG. 12 is a plan view of a base plate provided at the brake lever shown in FIG. 11.

In addition, note that as shown in FIG. 12, a mode selection groove 112a which constitutes a guide to the lever main body 115 is formed in the base plate 112, and the lever main body 115 is passed through the mode selection groove 112a so as to be attached to the brake lever support pin 114.

As shown in FIG. 12, the mode selection groove 112a is segmented into a main brake mode in which the brake can be applied arbitrarily in the both directions in which the wheel chair 201 moves forward and backward, a brake release mode in which no brake is applied either when the wheel chair 201 moves forward or when it moves backward, and an auxiliary brake mode in which the brake is automatically applied when the wheel chair 201 moves backward.

To be more specific, the movement of the lever main body 15 is designed to be restricted by cut and erect portions 113a which are formed in such a manner as to face from the base plate support bracket 113 inwardly of the mode selection groove 112.

Note that as will be described in detail later on, in the main brake mode, the lever main body 115 is caused to slide within a segment indicated by an arrow A in FIG. 12. In addition, in the brake release mode, the cut and erect portion 113a is brought into resilient engagement with a cavity portion in the lever main body 115 at a point B in the FIG. 12, whereby the lever main body 115 is locked in place. Additionally, in the auxiliary mode, the cut and erect portion 113a is brought into resilient engagement with the cavity portion in the lever main body 115 at a point C in FIG. 12, whereby the lever main body 115 is locked in place. Consequently, the function of the braked can arbitrarily be changed over by changing the position of the lever main body 115 to the designated positions for the respective modes.

In addition, a spring 118 is provided at the end portion of the operating lever 71 connected to the lever main body 115 via the wire 111. The spring 118 is a compression coil spring disposed as being compressed between a spring support arm 25b extending from the back plate 25 and the operating lever 71 and biases the operating lever 71 in such a manner as to move away from the spring support arm 25b.

Consequently, in the main brake mode state, the lever main body is supported while being resiliently biased to a brake release mode side within a range indicated by the arrow A in FIG. 12.

Figure 14:
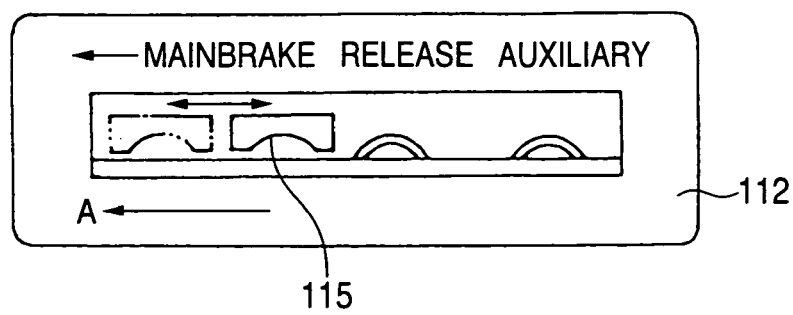
FIG. 14 is an explanatory drawing of positions in the main brake mode of the brake lever of the brake apparatus according to the third embodiment of the invention.
Figure 15:
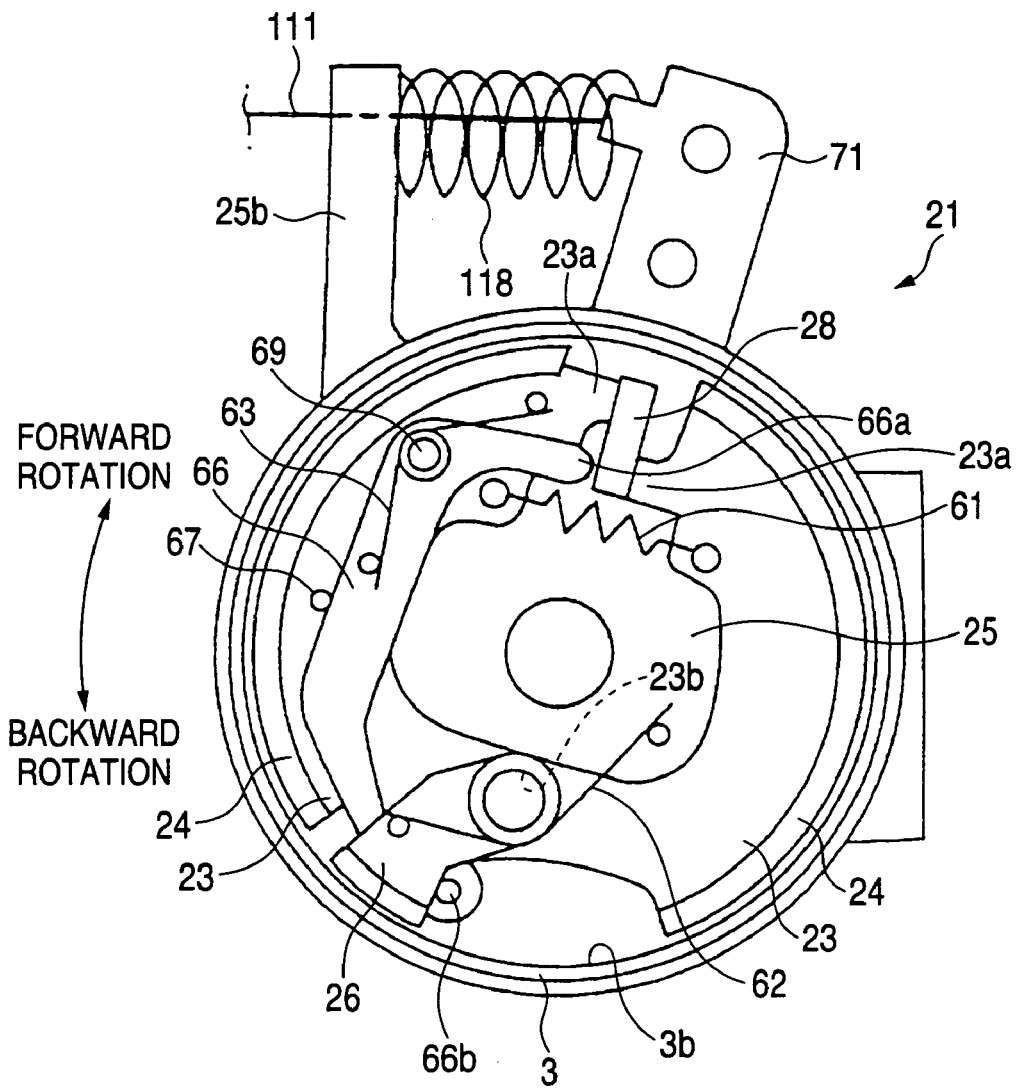
FIG. 15 is an explanatory drawing of operations in a brake release mode of the respective constituent parts of the brake apparatus according to the third embodiment of the invention.
Figure 16:
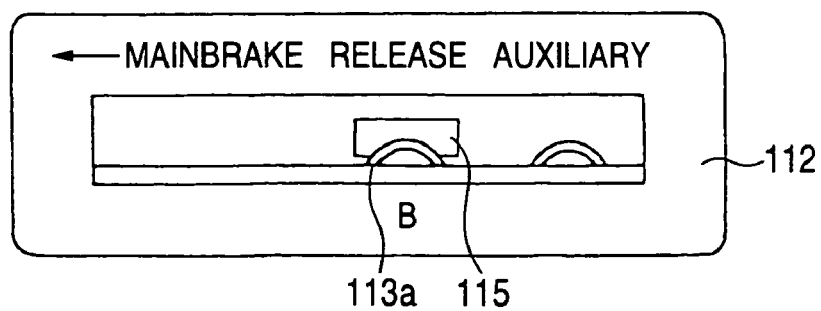
FIG. 16 is an explanatory drawing of a position in the brake release mode of the brake lever of the brake apparatus according to the third embodiment of the invention.
Figure 17:
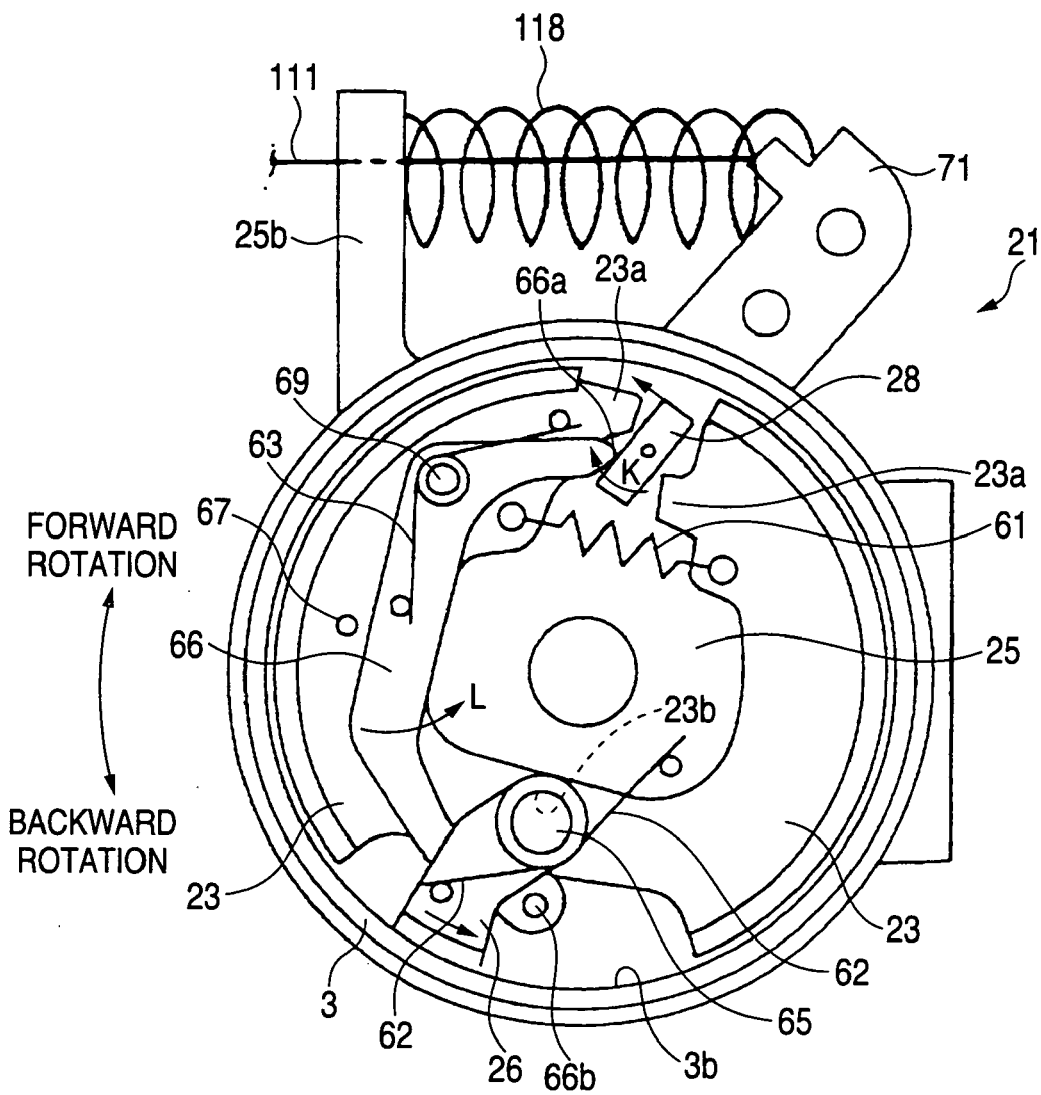
FIG. 17 is an explanatory drawing of operations in an auxiliary brake mode of the respective constituent parts of the brake apparatus according to the third embodiment of the invention.
Figure 18:
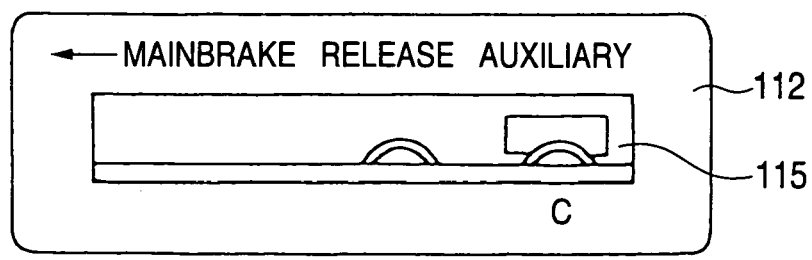
FIG. 18 is an explanatory drawing of a position in the auxiliary brake mode of the brake lever of the brake apparatus according to the third embodiment of the invention.

To follow, referring to FIGS. 13 to 18, operations of the respective constituent parts will be described. Note that FIG. 13 is a drawing which explains an operating state of the main brake mode. In addition, FIG. 14 is a drawing which shows a position of the brake lever 110 in the main brake mode. Hereinafter, similarly, FIGS. 15 and 16 are drawings which explain the brake release mode, and FIGS. 17 and 18 are drawings which explain the auxiliary brake mode.

(Main Brake Mode)

Firstly, the main brake mode will be described.

The main brake mode is a mode in which the user can arbitrarily apply the brakes in the both directions in which the wheel chair 201 moves forward and backward, and the brake force is generated by the brake shoes 22.

Then, in the main brake mode, in applying the brake, a mechanism is adopted in which when the lever main body 115 is pushed in the direction indicated by the arrow A in FIG. 14, the brake is applied, whereas when the force pushing the lever main body 115 is released, the lever main body 115 is pulled back in an opposite direction to the arrow A in FIG. 14 by the biasing force of the spring 118, whereby the brake is released.

Movements of the respective constituent parts in the main brake mode will be as follows.

In a case where the lever main body 115 is pushed in the direction indicated by the arrow A in FIG. 14 with a view to applying the brake, the actuation cam 28 rotates in a direction indicated by an arrow N in FIG. 13, contact points between the brake shoes 22 and the actuation cam 28 constitute a point of force, the anchor pin 65 constitutes a fulcrum, and the linings 24 of the brake shoes 22 constitute a point of application, and the linings 24 constituting the point of application are pressed against the brake drum inner circumferential surface 3b, whereby the brake is applied.

On the other hand, when the lever main body 115 returns to an opposite side to the direction indicated by the arrow A in FIG. 14, the actuation cam 28 returns in a direction indicated by an arrow R in FIG. 13, and the brake shoes 22 are moved apart from the brake drum inner circumferential surface 3b, whereby the brake is released.

Note that the position of the lock shoe restraining arm 27 in the main brake mode is, as shown in FIG. 13, held in a state in which the lock shoe restraining arm 27 is caused to contact the lock shoe restraining pin 67 by the lock shoe restraining spring 63.

Due to this, the lock shoe 26 comes to be held (restrained) at the position which is spaced apart from the brake drum inner circumferential surface 3b.

Note that since the rotating range of the actuation cam 28 is restricted to the range (the range indicated by the arrow A in FIG. 12) of the mode selection groove 112a which is used as the main brake mode, even when the actuation cam 28 rotates in the direction indicated by the arrow R in FIG. 13, there is no case where the lock shoe restraining arm 27 is caused to leap up by the actuation cam 28.

Consequently, in the main brake mode, there is provided a state in which the lock shoe 26 is restrained by the lock shoe restraining arm 27 at all times.

(Brake Release Mode)

To follow, the brake release mode will be described.

The brake release mode is a mode in which no brake is applied either in a direction in which the wheel chair 201 moves forward or in a direction in which the wheel chair 201 moves backward, and the brake shoes 22 and the lock shoe 26 are supported at the positions which are spaced apart from the brake drum inner circumferential surface 3b at all times.

The movements of the respective constituent parts in the brake release mode will be as follows.

Firstly, the user operates the lever main body 115 so as to be slid to a point B in FIG. 16, whereby the main brake mode or the auxiliary brake mode is changed over to the brake release mode.

Then, when the lever main body 115 is changed over to the brake release mode, the actuation cam 28 is fixed in a neutral state in which the actuation cam 28 does not rotate (incline) at all, and the respective brake shoes 22 are held at the positions which are spaced apart from the brake drum inner circumferential surface 3b by virtue of the tension of the spring 61 provided so as to extend between these brake shoes 22, 22.

In addition, as this occurs, the lock shoe 26 is, as in the case with the main brake mode, in the restrained state by the lock shoe restraining arm 27, and therefore, there is no case where the brake is applied even when the wheel chair 201 moves backward.

(Auxiliary Brake Mode)

To follow, the auxiliary brake mode will be described.

The auxiliary brake mode is a mode in which the brake is automatically applied when the wheel chair 201 moves backward or when the wheel 101 rotates backward, and the brake force is generated by the lock shoe 26.

When applying the brake in the auxiliary brake mode, firstly, the lever main body 15 is caused to slide to a point C in FIG. 18. In that state, when the user has nearly reached a slope and there occurs a situation in which the wheel 101 starts to rotate backward, the brake is constructed to be automatically applied irrespective of the will of the user.

The movements of the respective constituent parts in the auxiliary brake mode will be as follows. When the lever main body 115 is caused to slide to the point C in FIG. 18 with a view to activating the auxiliary brake, the actuation cam 28 rotates in a direction indicated by an arrow K in FIG. 17, and the end portion of the lock shoe restraining arm 27 is pushed upwardly by the actuation cam 28. Then, at the same time as the lock shoe restraining arm 27 rotates in a direction indicated by an arrow L in FIG. 17 around the lock shoe restraining arm anchor pin 69 as a rotational center, the lock shoe support pin 66b moves apart from the lock shoe 26, whereby the restrained state of the lock shoe 26 is released.

On the other hand, the lock shoe 26, which is released from the restrained state by the lock shoe restraining arm 27, is then brought into contact with the brake drum inner circumferential surface 3b by virtue of the tension of the lock shoe spring 62.

Then, there is provided a mechanism in which when the brake drum 3 rotates backward in association with the wheel chair 201 climbing the slope, the lock shoe 26 is brought into engagement with the brake drum inner circumferential surface 3b by virtue of the self-energizing effect (the wedge effect), whereby the brake is applied. In addition, in the event that the user of the wheel chair 201 rotates the wheels 101 forward so as to advance the wheel chair 201, since the brake drum 3 also rotates forward, the engaged state between the lock shoe 26 and the brake drum inner circumferential surface 3b is released, whereby the wheel chair 201 is allowed to move forward.

Note that also in the event that the wheel 101 rotates forward in the auxiliary brake mode, the contact state of the lock shoe 26 with the brake drum inner circumferential surface 3b is maintained by the lock shoe spring 62, but when the brake drum 3 rotates forward, since no self-energizing effect is exhibited, there is no case where the brake is applied to the brake drum 3. In addition, since the tension of the lock shoe spring 62 is something like a tension which is simply good enough to maintain the lock shoe 26 in the contact state, there is sensed no resistance to the rotation of the wheel 101.

Then, in the event that the lever main body 115 is changed over to the other modes, since the actuation cam 28 rotates in a direction indicated by an arrow D in FIG. 17, the lock shoe restraining arm 27 is returned to its regular position by virtue of the tension of the lock shoe restraining spring 63 provided on the lock shoe restraining arm 27, whereby the lock shoe 26 is again put in the restrained state. Consequently, even when the wheel 101 rotates backward, there occurs a state in which no brake is applied.

FIGS. 19 to 24 show a fourth embodiment of a brake apparatus according to the invention.

A brake apparatus 81 according to the fourth embodiment is also a brake apparatus of a type which is generally referred to as a drum brake.

This brake apparatus 81 is installed in the wheel 101 of the wheel chair 201 shown in FIG. 10 to replace the brake apparatus 21 according to the third embodiment.

To be specific, the brake apparatus 81 is provided with a brake drum 3 which rotates together with the wheel 101 shown in FIGS. 10 and 2 and a leading shoe 14 and a trailing shoe 15 which constitute a pair of main brake shoes adapted for contact with an inner circumferential surface of the brake drum 3 so as to generate a brake force.

In addition, a back plate 83 which supports the leading shoe 14 within the brake drum 3 is also included in the construction of the brake apparatus 81, and is installed in each wheel of the wheel chair 201.

The brake drum 3 provided on the wheel 101 is, as shown in FIG. 2, fixed to the hub 102 which constitutes the rotational center of the wheel. 101 or the spokes 103 extending radially from the hub 102, and is provided such that the rotational center thereof coincides with the rotational center of the wheel 101.

To be more specific, the brake drum 3 is made up of a circular base plate portion 3a which is fixed to the hub 102 or the spokes 103 and a circumferential wall 3b of the brake drum 3 which extends from a circumferential edge of the base plate portion 3a toward a wheel chair 201 side when installed in the wheel chair 201, and an inner circumferential surface of the circumferential wall 3b constitutes a contact surface (a sliding friction surface) with the leading shoe 14 and the trailing shoe 15.

Then, the back plate 83 is provided between the frame 104 of the wheel chair 201 and the wheel 101 so that almost all the constituent parts which constitute the brake apparatus 81 are collected and disposed inwardly of the brake drum 3.

Note that an axle pass-through hole 83a is provided in a center of the back plate 83. When the back plate 83 is mounted, an axle (a rotational shaft) of the wheel is passed through this axle pass-through hole 83a to be placed therein, and the back plate 83 is fixed to the frame 104 in this state.

The constituent parts of the brake apparatus 81 which are provided on the back plate 83 include the leading shoe 14 and the trailing shoe 15 which constitute the pair of main brake shoes adapted for contact with the circumferential wall 3b so as to restrict the rotation of the brake drum 3 in both forward and backward rotating directions.

In addition, a lock shoe (a backward braking brake shoe) 84 is provided on the back plate 83 which is adapted for contact with the circumferential wall 3b when the brake drum 3 rotates backward so as to restrict the rotation of the brake drum 3 in the backward rotating direction.

Furthermore, provided on the back plate 83 is a lock shoe spring 86 which biases the lock shoe 84 to a position which is spaced apart from the circumferential wall 3*b*.

In addition, provided on the back plate 83 is an actuation cam (an expansion means) for controlling the brake force of the brake apparatus 81. The actuation cam 88 expands the leading shoe 14 and the trailing shoe 15 so as to be pressed against the circumferential wall 3*b* to thereby generate a brake force resulting from pressing by the leading shoe 14 and the trailing shoe 15.

In addition, the actuation cam 88 presses the lock shoe 84 against the circumferential wall 3*b* against the biasing force of the lock shoe spring 86 to thereby generate a brake force resulting from pressing by the lock shoe 84.

In addition to them, provided on the back plate 83 is an anchor pin 89 which rotatably fixes the leading shoe 14 and the trailing shoe 15, and the lock shoe 84. Furthermore, provided on the back plate 83 is a brake shoe spring 90 which biases the leading shoe 14 and the trailing shoe 15 to positions which are spaced apart from the circumferential wall 3*b*.

Figure 19:
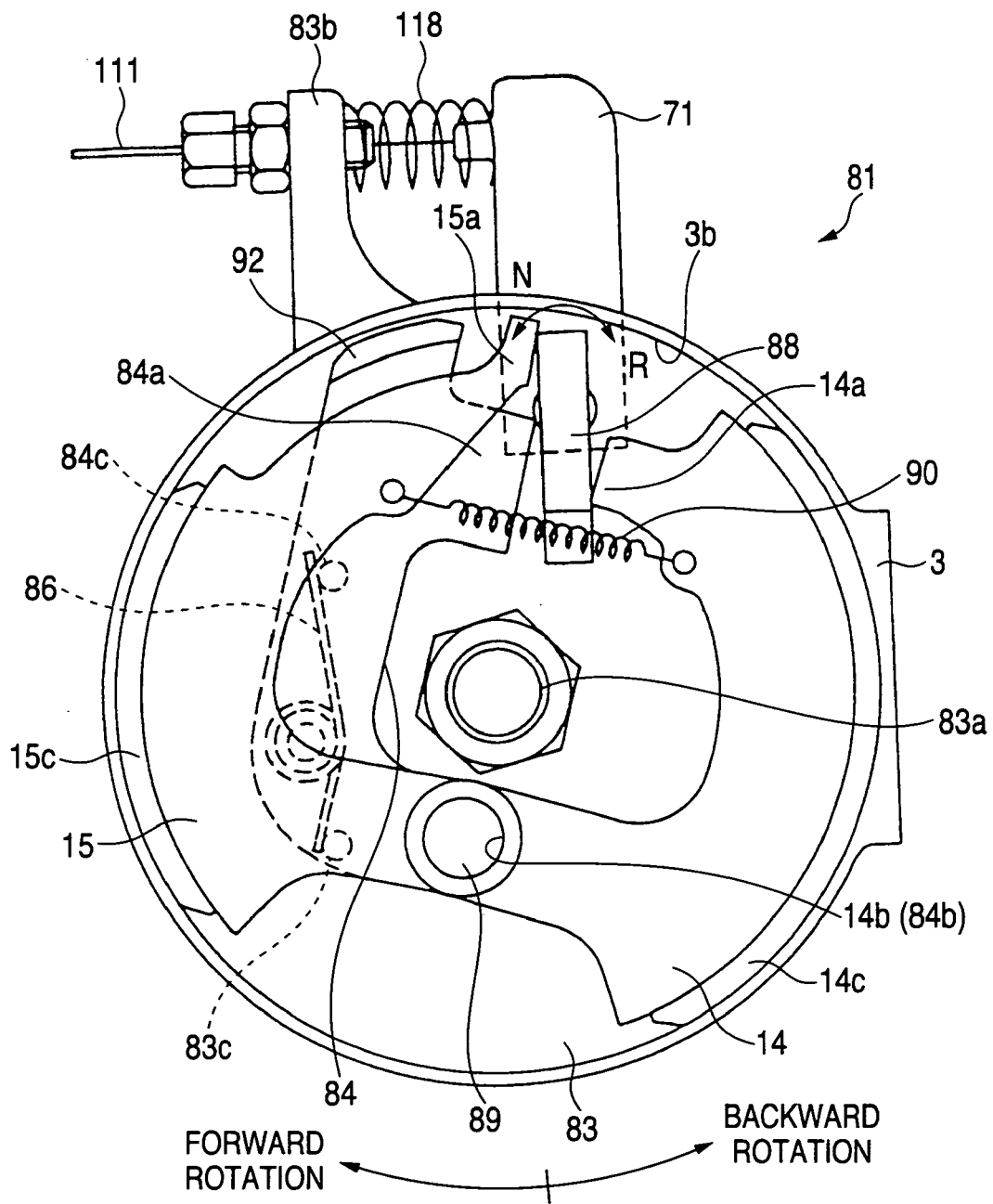
FIG. 19 is an explanatory drawing of operations in a main brake mode of respective constituent parts of a fourth embodiment of a brake apparatus according to the invention.

The leading shoe 14 is formed into a segment and has at one end thereof a leading shoe abutment portion 14*a* which is brought into abutment with the actuation cam 88, as shown in FIG. 19. Then, the leading shoe 14 has at the other end thereof a leading shoe fixing hole 14*b* which constitutes a rotational center of the leading shoe 14.

In addition, the leading shoe 14 has a leading shoe lining 14*c* adapted for contact with the circumferential wall 3*b*. Then, by fitting the anchor pin 89 which is provided closer to a lower portion of the back plate 83 in FIG. 19 in the leading shoe fixing hole 14*b*, the leading shoe 14 is rotatably provided on the anchor pin 89 as a rotational center thereof.

As with the leading shoe 14, the trailing shoe 15 is formed into a segment, and has at one end thereof a trailing shoe abutment portion which is brought into abutment with the actuation cam 88, as shown in FIG. 19. Then, the trailing shoe 15 has at the other end thereof a trailing shoe fixing hole 15*b* which constitutes a rotational center of the trailing shoe 15.

In addition, the trailing shoe 15 has a trailing shoe lining 15*c* adapted for contact with the circumferential wall 3*b*. Then, by fitting the anchor pin 89 which is provided closer to the lower portion of the back plate 83 in FIG. 19 in the trailing shoe fixing hole 15*b*, the trailing shoe 15 is rotatably provided on the anchor pin 89 as a rotational center thereof.

Here, when looking at the positions where the leading shoe 14 and the trailing shoe 15 are placed, while the two shoes are not members having the same configuration, the leading shoe 14 and the trailing shoe 15 are placed at positions which are substantially axially symmetrical relative to a straight line passing two points which are a center of the axle passing through the interior of the brake drum 3 and an axial center of the anchor pin 89.

Moreover, the leading shoe 14 and the trailing shoe 15 are placed in such a manner that the leading shoe lining 14*c* and the trailing shoe lining 15*c* confront the circumferential wall 3*b*, respectively.

Namely, the leading shoe 14 and the trailing shoe 15 are rotatably connected to each other by the anchor pin 89. Then, when the actuation cam 88 rotates, the leading shoe abutment portion 14*a* and the trailing shoe abutment portion 15*a* function as a point of force, and the leading shoe lining 14*c* and the trailing shoe lining 15*c* constitute a point of application with the anchor pin 89 functioning as a fulcrum.

Then, when the leading shoe lining 14*c* and the trailing shoe lining 15*c* are pressed against the circumferential wall 3*b*, then a brake force is generated.

Note that the leading shoe 14 and the trailing shoe 15 are connected to each other by the brake shoe spring 90 and that the leading shoe lining 14*c* and the trailing shoe lining 15*c* are held at position which are spaced apart from the circumferential wall 3*b* at a normal time. Here, the normal time means a state in which no external force is being applied to the leading shoe 14 and the trailing shoe 15.

On the other hand, the lock shoe 84 which exhibits a brake force when the brake drum 3 rotates backward extends from the anchor pin 89 toward the circumferential wall 3*b*.

This lock shoe 84 has a lock shoe lining 92 adapted for contact with the lock shoe 84 and the circumferential wall 3*b* and the lock shoe spring 86 which biases the lock shoe 84 so as to be spaced apart from the circumferential wall 3*b* at the normal time.

In addition, as shown in FIG. 19, the lock shoe 84 has at one end thereof a lock shoe abutment portion 84*a* which is brought into abutment with the actuation cam 88. Furthermore, the lock shoe 84 has at the other end thereof a lock shoe fixing hole 84*b* which constitutes a rotational center of the lock shoe 84.

Then, as with the leading shoe 14 and the trailing shoe 15, the lock shoe 84 is rotatably provided on the anchor pin 89 via the lock shoe fixing hole 84*b*. A linear distance from the lock shoe fixing hole 84*b* in the rock shoe 84 to the lock shoe lining 92 is formed so as to be slightly longer when compared with a shortest linear distance from the lock shoe fixing hole 84*b* in the lock shoe 84 to the circumferential wall 3*b*.

Figure 24:
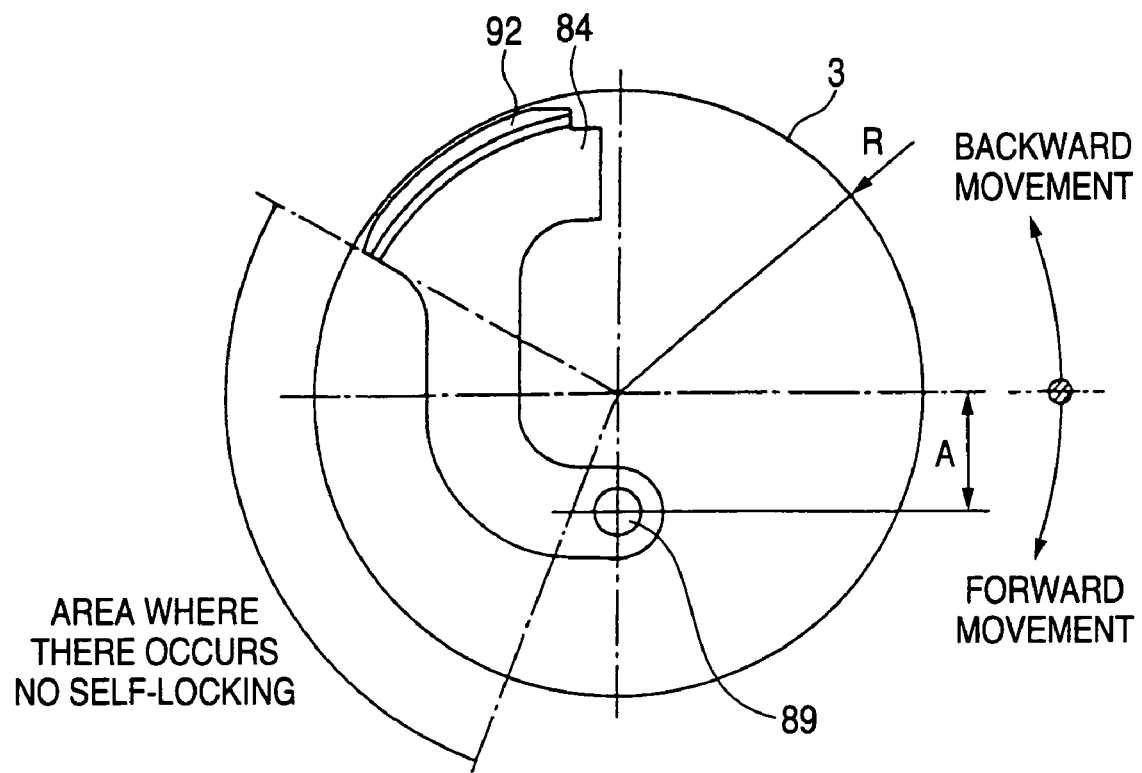
FIG. 24 is a drawing showing the lock shoe lining application position in the fourth embodiment of the brake apparatus according to the invention.

In addition, a contact surface of the lock shoe 84 with the brake drum 3 or a position where the lock shoe lining 92 is applied relative to the brake drum 3 is positioned between a position where the trailing shoe 15 is applied and the actuation cam 88, and the lock shoe 84 is provided at a position which deviates from an area where there occurs no self-locking, as shown in FIG. 24.

Figure 22:
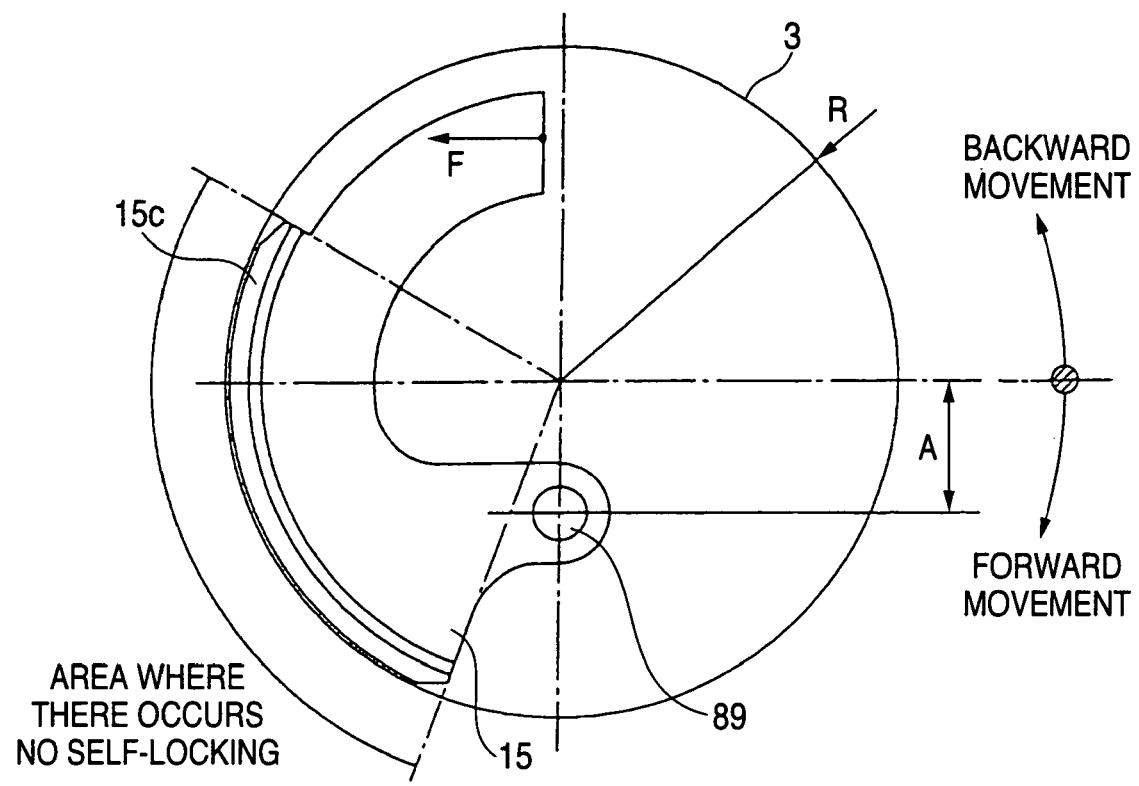
FIG. 22 is an explanatory drawing of an area where no self-locking of a lock shoe occurs in the fourth embodiment of the brake apparatus according to the invention.

Note that as shown in FIG. 22, the trailing shoe lining 15*c* is provided at a position where there occurs no self-locking (this is true with the leading shoe lining 14*c*). The area where there occurs no self-locking shown in FIGS. 22, 23, 24 is obtained from a radius R of the brake drum 3, a distance A between a center of the axle which passes through the interior of the brake drum 3 and the axial center of the anchor pin 89 and a friction coefficient m.

Since the lock shoe 84 is assembled so that the lock shoe lining 92 is positioned between the trailing shoe lining 15*c* and the actuation cam 88, the rotation in the backward rotating direction can be restricted by the lock shoe 84 when the wheel rotates backward, and a superior layout property of the lock shoe 84 is provided.

Figure 23:
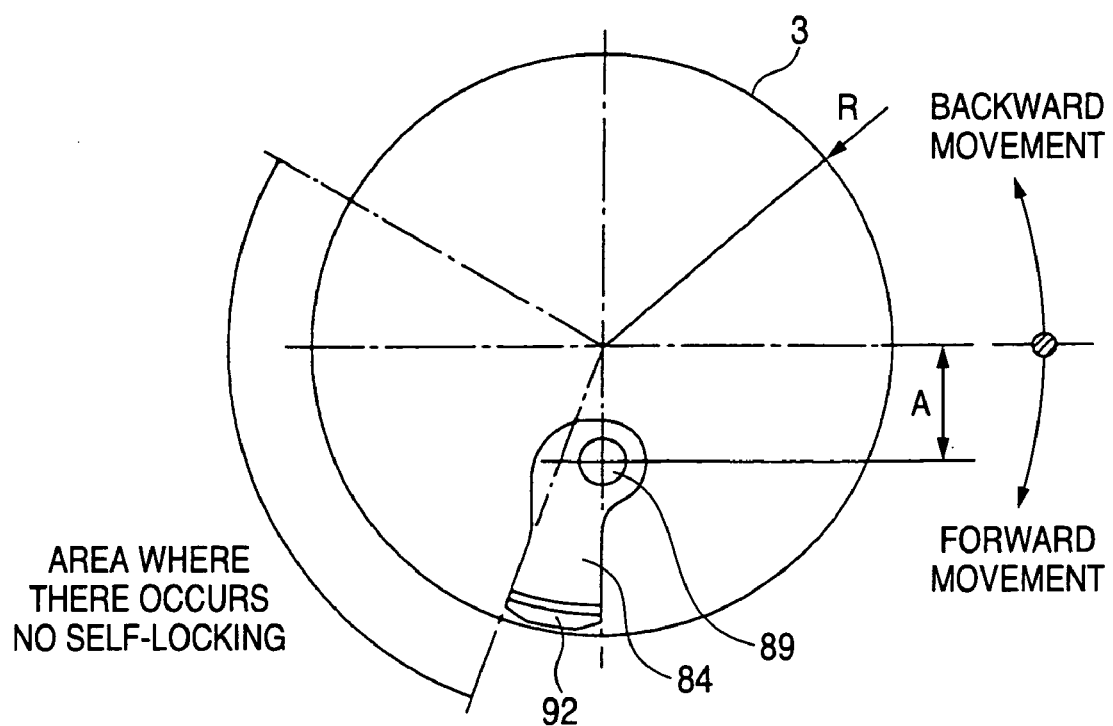
FIG. 23 is a layout drawing of the lock shoe in a case where a lock shoe lining application position is provided on an anchor pin side in the fourth embodiment of the brake apparatus according to the invention.

In addition, as shown in FIG. 23, in the event that the application position of the lock shoe lining 92 resides at a position close to the shortest linear distance from the lock shoe fixing hole 84*b* to the circumferential wall 3*b* or in the event that the application position of the lock shoe lining 92 resides on an anchor pin 89 side, in case a strong impact should be applied to the brake apparatus 81 while the lock shoe 84 is in use, there is caused a so-called ride-on state in which the lock shoe 84 rides on the circumferential wall 3*b* by virtue of slight positional deviations of the respective parts or elastic deformations thereof, and the lock shoe lining 92 is displaced from a contacting state with the circumferential wall 3*b*, whereby there is caused a risk that the brake force of the lock shoe 84 is lost.

However, the lock shoe 84 is formed such that the linear distance from the lock shoe fixing hole 84b to the lock shoe lining 92 becomes slightly longer when compared with the shortest linear distance from the lock shoe fixing hole 84b to the circumferential wall 3b, and furthermore, the lock shoe 84 is formed at the position which is substantially axially symmetrical relative to the liner perpendicular which passes through the two points such as the center of the axle passing through the interior of the brake drum 3 and the axial center of the anchor pin 89, whereby even if elastic deformations occur in the respective parts as would be caused when a strong impact is imparted to the brake apparatus 81 while the lock shoe 84 is in use, there occurs no case where the lock shoe 84 rotates beyond the dead point of the contacting state with the circumferential wall 3b.

In addition, since the lock shoe lining 92 maintains the contacting state with the circumferential wall 3b even under the aforesaid condition, there is no risk that the lock shoe 84 loses its brake force.

Thus, by forming the lock shoe 84 such that the length from the lock shoe fixing hole 84b to the lock shoe lining 92 becomes slightly longer when compared with the shortest linear distance from the lock shoe fixing hole 84b to the circumferential wall 3b, a contact angle at which the lock shoe 84 contact the circumferential wall 3b can be secured in an increased fashion. As a result, the lock shoe 84 provides a superior brake force.

In addition, the lock shoe 84 receives direct pressing from the actuation cam 88 to be brought into contact with the circumferential wall 3b. Due to this, a superior operability can be provided with no link being interposed and with a less number of parts being involved.

Then, as shown in FIG. 19, the lock shoe abutment portion 84a which is brought into abutment with the actuation cam 88 is provided at one end of the lock shoe 84 and the lock shoe spring 86 which biases the lock shoe 84 so as to be supported at the position which is space apart from the circumferential wall 3b is provided at the other end of the lock shoe 84.

Note that a lock shoe pin 84c with which one end of the lock shoe spring 86 is brought into contact is provided on the lock shoe 84. In addition, a back plate pin 83c with which the other end of the lock shoe spring 86 is brought into abutment is provided on the back plate 83.

On the other hand, the actuation cam 88 which is brought into contact with the leading shoe 14 and the trailing shoe 15, and the lock shoe 84 is formed substantially into a rectangular plate-like shape and is connected with an operating lever 71 provided on a back of the back plate 83 in such a manner as to freely swing at an upper portion of the back plate 83. Namely, a construction is adopted in which when the operating lever 71 is swung, the actuation cam 88 rotates in conjunction with the movement of the operating lever 71.

Here, there is provided a mechanism in which the brake lever 110 shown in FIG. 11 is connected to an end portion of the operating lever 71 via the wire 111 so that the operating lever 71 is swung through interlock with the operation of the brake lever 110 when the brake lever 110 is operated. Namely, the actuation cam 88 is constructed so as to rotate by the operation of the brake lever 110.

Note that the brake lever 110 is constructed to have a base plate 112 as fixed to the frame 104 of the wheel chair 201 shown in FIG. 11, a brake lever support bracket 113 which extends downwardly of the base plate 112, a brake lever support pin 114 provided on the brake lever support bracket 113 and a lever main body 115 which is rotatably provided on the brake lever support pin 114.

Here, while the mounting position of the brake lever 110 onto the frame 104 is arbitrary, as shown in FIG. 10, the brake lever 110 may be preferably provided on the hand rail portion 116 of the wheel chair 201 where an easy operation by the user can be provided.

In addition, as shown in FIG. 12, a mode selection groove 112a which constitutes a guide to the lever main body 115 is formed in the base plate 112, and the lever main body 115 is passed through the mode selection groove 112a to be mounted on the brake lever support pin 114.

Here, as shown in FIG. 12, the mode selection groove 12a is segmented into a main brake mode in which the brake can arbitrarily be applied in both directions in which the wheel chair 201 moves forward and backward, a brake release mode in which no brake is applied either when the wheel chair 201 moves forward or when it moves backward, and an auxiliary brake mode in which the brake is automatically applied when the wheel chair 201 moves backward.

To be more specific, the movement of the lever main body 115 is designed to be restricted by cut and erect portions 13a which are formed in such a manner as to face from the brake lever support bracket inwardly of the mode selection groove 112a.

Note that when the main brake mode is used, the lever main body 115 is caused to slide within the segment indicated by the arrow A in FIG. 12.

In addition, in the brake release mode, the lever main body 115 is locked at the point B in FIG. 12. Furthermore, in the auxiliary mode, the lever main body 115 is locked at the point C in FIG. 12.

Consequently, by changing over the position of the lever main body 115 to the designated positions for the respective modes, the function of the brake can arbitrarily be selected.

Note that a spring 118 is provided at an end portion of the operating lever 71 which is connected to the lever main body 115 via the wire 111. The spring 118 is disposed between a spring support arm 83b extending from the back plate 83 and the end portion of the operating lever 71 to bias the operating lever 71 in such a manner as to be moved away from the spring support arm 83b. Consequently, in the main brake mode state, the lever main body 115 comes to be supported on a brake release mode side in the segment indicated by the arrows A in FIG. 12.

To follow, the movements of the respective constituent parts will be described by reference to the drawings.

Note that FIG. 19 is a drawing which explains the operating state of the main brake mode.

In addition, FIG. 14 is a drawing which shows the position of the brake lever 110 when the main brake mode is used.

Figure 20:
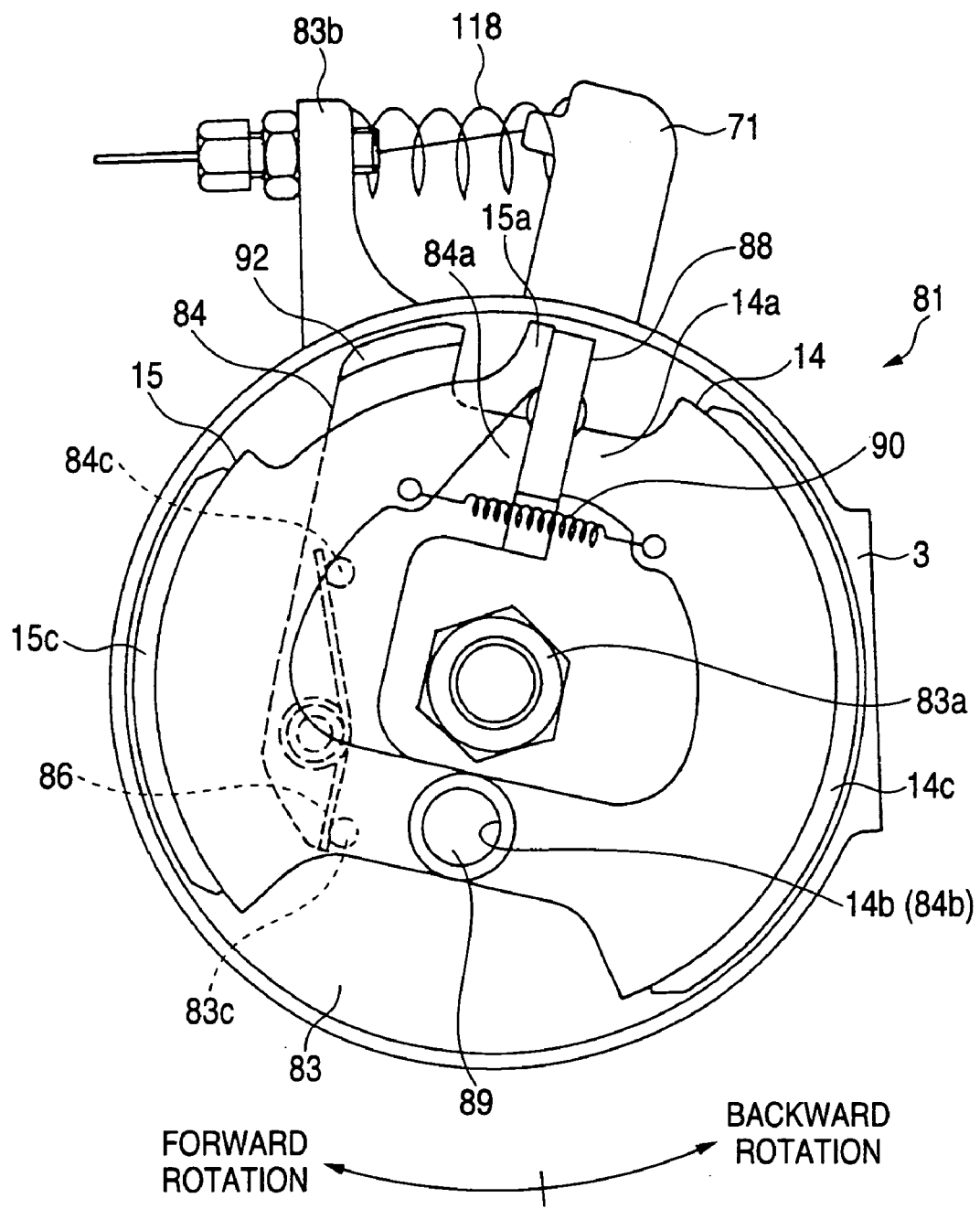
FIG. 20 is an explanatory drawing of operations in a brake release mode of the respective constituent parts of the fourth embodiment of the brake apparatus according to the invention.
Figure 21:
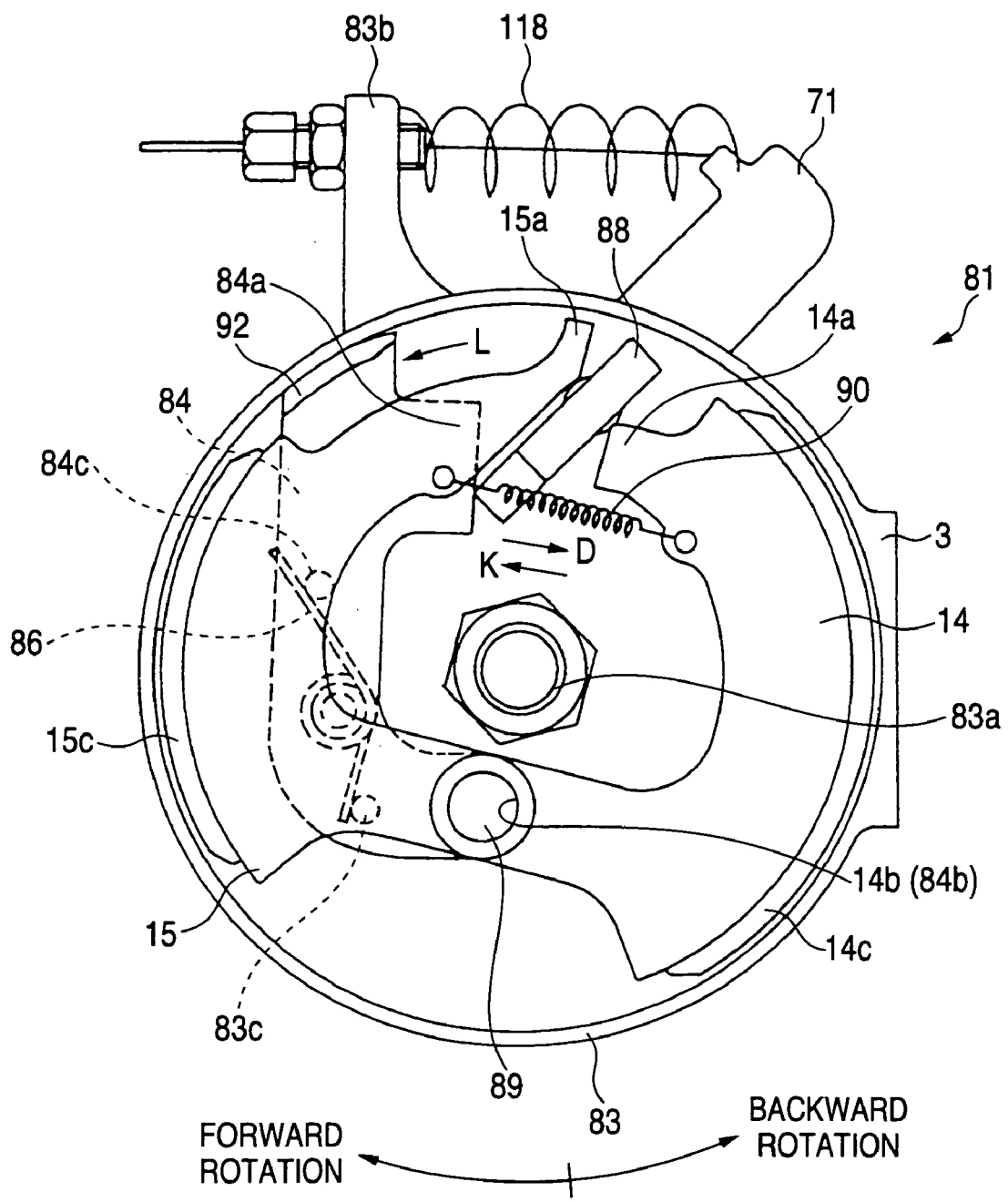
FIG. 21 is an explanatory drawing of operations in an auxiliary brake mode of the respective constituent parts of the fourth embodiment of the brake apparatus according to the invention.

Similarly, FIGS. 20 and 16 are drawings which explain the position of the brake lever 110 when the brake release mode is used, and FIGS. 21 and 18 are drawings which explain the position of the brake lever when the auxiliary brake mode is used.

(Main Brake Mode)

Firstly, the main brake mode will be described.

The main brake mode is a mode in which the user can arbitrarily apply the brakes in the both directions in which the wheel chair 201 moves forward and backward.

In the main brake mode, the brake force is generated by the leading shoe 14 and the trailing shoe 15. Then, there is provided a mechanism in which in applying the brake when the main brake mode is used, the brake is applied when the lever main body 115 is pushed in the direction indicated by the arrow A in FIG. 14, whereas when the force which pushes the lever main body 115 is released, the lever main body 115 is pulled back in the opposite direction to the direction indicated by the arrow A in FIG. 14 by the tension of the spring 118, whereby the brake is released.

The movements of the respective constituent parts will be as follows.

When the lever main body 115 is pushed in the direction indicated by the arrow A in FIG. 14 with a view to applying the brake, an operation force is transmitted from the lever main body 115 via the wire 111, whereby the operating lever 71 is swung. Then, the actuation cam 88 which is connected with the operating lever 71 rotates in a direction indicated by an arrow N in FIG. 19 about a rotational shaft of the actuation cam 88.

As this occurs, the leading shoe abutment portion 14a and the trailing shoe abutment portion 15a which constitute contact points with the actuation cam 88 become a point of force. In addition, the anchor pin 89 becomes a fulcrum and the leading shoe lining 14c and the trailing shoe lining 15c become a point of application.

Then, the leading shoe lining 14c and the trailing shoe lining 15c which constitute the point of application are pressed against the circumferential wall 3b, whereby the brake is applied.

On the other hand, when the lever main body 115 is returned in the opposite direction to the direction indicated by the arrow A in FIG. 14, the operating force is transmitted from the lever main body 115 via the wire 111, whereby the operating lever 71 is swung.

Furthermore, the actuation cam 88 connected with the operating lever 71 returns in a direction indicated by an arrow R in FIG. 19, and the leading shoe 14 and the trailing shoe 115 are moved away from the circumferential wall 3b, whereby the brake is released.

Note that the position of the lock shoe 84 in the main brake mode is, as shown in FIG. 19, held in a state in which the lock shoe 84 is spaced apart from the circumferential wall 3b by virtue of the biasing force of the lock shoe spring 86.

Consequently, in the main brake mode, the lock shoe 84 is held at the position which is spaced apart from the circumferential wall 3b at all times by virtue of the biasing force of the lock shoe spring 86.

(Brake Release Mode)

To follow, the brake release mode will be described.

The brake release mode is a mode in which the brake is applied neither when the wheel chair 201 moves forward nor when it moves backward.

In the brake release mode, the leading shoe 14 and the trailing shoe 15, and the lock shoe 84 are, as shown in FIG. 20, held at the positions which are spaced away from the circumferential wall 3b at all times.

The movements of the respective constituent parts in this brake release mode will be as follows.

Firstly, the user operates the lever main body 115 so that the lever main body 115 is caused to slide to the point B in FIG. 16, whereby the main brake mode or the auxiliary brake mode is changed over to the brake release mode.

Then, when the lever main body 115 is changed over to the designated position for the brake release mode, the actuation cam 88 is held at the neutral state in which the actuation cam 88 does not rotate at all, and the leading shoe 14 and the trailing shoe 15 are held at the positions which are spaced apart from the circumferential wall 3b, respectively, by virtue of the tension of the brake shoe spring 90 which connects the respective shoes to each other.

In addition, as this occurs, as with when the main brake mode is used, the lock shoe 84 is in the state in which the lock shoe 84 is spaced apart from the circumferential wall 3b by means of the lock shoe spring 86, and no brake is applied also when the wheel chair 201 moves backward.

(Auxiliary Brake Mode)

To follow, the auxiliary brake mode will be described.

The auxiliary brake mode is a mode in which the brake is automatically applied when the wheel chair 201 moves backward or when the wheel 101 rotates backward. In the auxiliary brake mode, the brake force is generated by means of the lock shoe 84.

When applying the brake in the auxiliary brake mode, firstly, the lever main body 115 is caused to slide to the point C in FIG. 18. Then, when the user is about to reach a slope and there occurs a situation in which the wheels 101 start to rotate backward, the brakes are automatically applied regardless of the will of the user.

The movements of the constituent parts in the auxiliary brake mode will be as follows.

When the lever main body 115 is caused to slide to the point C in FIG. 18 with a view to activating the auxiliary brake, the actuation cam 88 rotates in a direction indicated by an arrow K in FIG. 21 about the rotational shaft of the actuation cam 88. Then, the lock shoe abutment portion 84a is pushed upwardly as shown in FIG. 21 by the actuation cam 88.

Then, the lock shoe 84 rotates in a direction indicated by an allow L in FIG. 21 about the lock shoe fixing hole 84b as a rotational center. As a result, the lock shoe 84 is brought into contact with the circumferential wall 3b by virtue of pressing by the actuation cam 88 against the biasing force of the lock shoe spring 86.

Consequently, there is provided a mechanism in which the lock shoe 84 is brought into engagement with the circumferential wall 3b by virtue of the self-energizing effect (the wedge effect), whereby the brake is applied when the brake drum 3 rotates backward as the wheel chair 201 climbs the slope.

As this occurs, since the configuration of the lock shoe 84 is such that a linear distance from the lock shoe fixing hole 84b to the lock shoe lining 92 is made longer than a shortest linear distance from the lock shoe fixing hole 84b to the circumferential wall 3b, a contact angle at which the lock shoe lining 92 contact the circumferential wall 3b becomes large, whereby the brake force in the auxiliary brake mode provides a higher brake performance.

In addition, in the event that the user of the wheel chair 201 rotates the wheels 101 forward to move the wheel chair 201 forward, since the brake drum 3 also rotates forward, the engaged state between the lock shoe 84 and the circumferential wall 3b is released, whereby the wheel chair 201 is allowed to move forward.

Note that when the wheel 101 rotates forward in the auxiliary brake mode, while the contacting state of the lock shoe 84 with the circumferential wall 3b is maintained by the actuation cam 88, when the brake drum 3 rotates forward, since the self-energizing effect is exhibited, there is no case where the brake is applied to the brake drum 3.

Then, when the lever main body 115 is changed over to the other modes, the actuation cam 88 rotates in a direction indicated by an arrow D in FIG. 21 about the rotational shaft of the actuation cam 88. Consequently, the lock shoe 84 is returned to its regular position by virtue of the tension of the lock shoe spring 86 provided on the lock shoe 84, whereby the lock shoe 84 is put in the state in which the lock shoe 84 is spaced apart from the circumferential wall 3b.

Consequently, there occurs a state in which no brake is applied also when the wheel 101 rotates backward.

Note that while the descriptions have been made as the brake apparatus of the invention being applied to the wheel chair in the embodiments that have been described heretofore, the brake apparatus according to the invention can be applied not only to wheel chairs but also to general light vehicles including baby carriages and bogies. In addition, while the brake apparatus is desirably provided on each wheel when applied to the wheel chair, the brake apparatus may be provided only on one of the wheels. Additionally, while the brake drum is fixed to the spokes or hub of the wheel, the brake drum may be attached to the axle which extends from the rotational center of the wheel.

While the invention has been described in detail or by reference to the particular embodiments, it is apparent to those skilled in the art that various changes and modifications can be made thereto without departing from the spirit and scope of the invention.

The present patent application is based upon the Japanese Patent Application (Patent Application No. 2001-283616), and is incorporated herein in its entirety by express reference thereto.

INDUSTRIAL APPLICABILITY

As is clear from the descriptions that have been made heretofore, according to the brake apparatus of the invention described in (1), since the brake means does not contact directly the wheel (tire) and exhibits the brake force via the brake drum to thereby restrict the rotation thereof, even if the contact resistance on the surface of the wheel changes due to various factors such as the wet surface of the wheel that would result from running in the rain, the degree of wear of the wheel (tire) and the air pressure of the wheel, a stable brake force can be obtained at all times.

In addition, as is described in (2), with the brake means which is constructed to exhibit the brake force when the brake drum rotates backward, under the condition where the wheels revolve backward as occurring, for example, when the wheel chair is started from rest on a slope or kept climbing the slope, since the brakes are automatically applied irrespective of the will of the user, the user does not have to pay attention to the backward rotation of the wheels, whereby the slope starting and climbing can be facilitated.

Additionally, since the brake means is incorporated within the brake drum, when compared with the conventional construction in which the brake means is brought into direct contact with the wheel, the parts do not have to be enlarged in size according to the size of the wheels, whereby the size and weight can be reduced. Then, since the exposure of the braking parts to the outside can be prevented due to the incorporation thereof within the brake drum, the appearance of the wheel chair equipped with the brake apparatus can aesthetically be improved.

In addition, with the brake apparatus according to (3) and (4), the existence and non-existence of a brake force applied to the wheel can arbitrarily selected by changing over the operations of the lock shoe restraining arm by the brake force selecting means. For example, the wheel chair can run safely even under the condition where the wheels rotate backward by changing over the brake force selecting means to the auxiliary brake mode. In addition, since no brake is applied either when the wheel chair moves forward or when it moves backward by changing over the brake force selecting means to the brake release mode, the wheel chair can be moved forward and backward according to the will of the user.

Additionally, with the brake apparatus according to (5) and (6), for example, in addition to the facilitation of the slope starting and climbing, the wheels are locked by changing over the brake force selecting means to the brake lock mode, whereby the wheel chair can be stopped in an ensured fashion even on an inclined ground. In addition, since the brake means which exhibits various types of brake forces can be constituted by the brake drum, the backward rotation lock shoe, the forward rotation brake shoe and the lock shoe restraining arm, the brake means so constituted is suitable for reducing the size and weight and can be produced inexpensively. Furthermore, since the respective constituent parts are incorporated in the interior of the brake drum, this can contribute to aesthetically improving the appearance.

Additionally, with the brake apparatus according to (7), since the rotation of the brake drum (wheel) is restricted by the second brake means under the condition where the wheel rotates only in one direction such as when the wheel chair is kept climbing a slope and started from rest on the slope, the wheel chair can move forward without being forced to move backward even when being started from rest on a slope and kept climbing the slope.

In addition, since the brake for normal running and the auxiliary brake which functions as a brake for slope starting and slope climbing are incorporated within the brake drum provided on the rotational shaft of the wheel, being different from the conventional case where the brake means is brought into direct contact with the wheel, the brake means does not have to be enlarged in size as the wheel is enlarged, whereby the brake apparatus can be produced small in size and light in weight at inexpensive costs.

Additionally, since the brake means is provided which can obtain the brake force by being applied to the brake drum not by being brought into direct contact with the wheel, a stable and constant brake force can be obtained at all times even in states where the wheel chair is run in the rain and the tire gets worn. In addition, with the brake apparatus according to (8), the brake forces applied to the wheel can arbitrarily be changed over through a single action which operates the mode selection means. Then, at the time of normal running where the wheels are freely rotated forward and backward, by selecting the main brake mode, the brakes are applied based on his or her own will of the user. In addition, in case the brake release mode is selected, since no brake is applied both when the wheels are rotated forward and when the wheels are rotated backward, a nimble movement of the wheel chair by a third person can be facilitated. Additionally, in a condition where the wheels rotate in one direction, for example, on a slope or an inclined ground, by selecting the auxiliary brake mode, since the backward rotation of the wheels can be prevented by applying the brakes when the wheels rotate backward, the wheel chair can easily be started from rest on a slope and kept climbing the slope. Furthermore, with the brake apparatus according to (9), the brake apparatus itself can be realized with a relatively small number of parts such as, in addition to the brake drum provided on the wheel, the brake shoes for normal braking, the lock shoe for auxiliary braking, the lock shoe restraining arm for making the auxiliary brake inoperative, and the actuation cam for controlling the operations of the pair of brake shoes and the lock shoe restraining arm according to the respective modes, and by incorporating the respective parts within the brake drum, the brake apparatus can be attempted to be made smaller in size and lighter in weight, and the costs can also be attempted to be reduced.

In addition, with the brake apparatus according to (10), since the rotation of the wheel in the backward direction is restricted by the backward braking brake shoe when the wheel rotates backward, even when it is started from rest on a slope and kept climbing the slope, the wheel chair can be kept advancing without being forced to be reversed.

In addition, the backward braking brake shoe and the device for pressing this backward braking brake shoe against the inner circumferential surface of the brake drum can all be incorporated within the brake drum provided on the rotational shaft of the wheel, whereby the brake apparatus can be attempted to be made smaller in size and lighter in weight, and the production costs can also be attempted to be reduced.

Additionally, since the brake force is obtained by virtue of friction with the brake drum not by virtue of direct contact with the wheel, a constant brake force can stably be obtained at all times even in states in which the wheel chair is run in the rain, the tire gets worn and the air pressure of the tire is reduced.

Then, with the brake apparatus according to (11), when the wheel chair is started from rest on a slope and is kept climbing the slope, in case the backward rotation of the wheel occurs and the brake is started to be applied by the backward braking brake shoe, since the braking state is securely maintained due to the self-lock of the backward braking brake shoe until the backward rotation of the wheel is eliminated, the reliability in braking for preventing backward rotations is improved.

In addition, in the brake apparatus according to (12), with a view to obtaining higher braking performance on the brake apparatus described in (10) above, preferred combinations of locations, dimensions and configurations of the constituent parts are indicated, and with such constructions, the original goal of reduction in size, weight and cost can easily be attained.

What is claimed is:

1. A brake apparatus for restricting a rotation of a wheel via a brake drum rotating together with the wheel, comprising:
    a lock shoe for restricting the rotation of the brake drum by a self-energizing effect generated by wedge engagement with an inner circumferential surface of the brake drum only when the brake drum rotates in a backward direction;
    a brake force selecting means for applying or not applying a brake force to the wheel when selected from modes at least including:
        an auxiliary brake mode for applying a brake force of the lock shoe to the brake drum, and
        a brake release mode for not applying the brake force by the lock shoe;
    a lock shoe restraining arm for restraining the lock shoe at a position apart from the inner circumferential surface of the brake drum, wherein a restrained state of the lock shoe by the lock shoe restraining arm is released in the auxiliary brake mode, and the restrained state of the lock shoe by the lock shoe restraining arm is maintained in the brake release mode, and
    a forward rotation lock shoe for restricting the rotation of the brake drum by a self-energizing effect generated by wedge engagement with an inner circumferential surface of the brake drum only when the brake drum rotates in a forward direction,
    wherein the modes further includes the brake lock mode for applying the brake force by the lock shoe and a brake force by the forward rotation lock shoe to the brake drum,
    wherein the forward rotation lock shoe rotatably provided on the stationary shaft in such a manner as to confront the lock shoe the lock shoe restraining arm individually restrains the lock shoe and the forward rotation lock shoe at positions apart from the inner circumferential surface of the brake drum,
    in the auxiliary brake mode, only a restrained state of the lock shoe by the lock shoe restraining arm is released,
    in the brake lock mode, restrained states of the lock shoe and the forward rotation lock shoe by the lock shoe restraining arm are both released, and
    in the brake release mode, the restrained states of the lock shoe and the forward rotation lock shoe by the lock shoe restraining arm are both maintained.

2. A brake apparatus according to claim 1, wherein the lock shoe is rotatably provided on a stationary shaft supported inwardly of the brake drum.

3. A brake apparatus according to claim 1, further comprising:
    a brake shoe for being activated to the inner circumferential surface of the brake drum to restrict the rotation of the brake drum in both directions.

4. A brake apparatus according to claim 3, wherein the modes further includes a main brake mode for activating the brake shoe to the brake drum, and
    in the brake release mode, the brake shoe is inoperative.

5. A brake apparatus comprising:
    a backward braking brake shoe rotatably supported on a back plate, so as to be brought into engagement with the inner circumferential surface of a brake drum, and to restrict the rotation of the wheel only in the backward direction;
    a brake force selecting means for applying or not applying a brake force to the wheel when selected from modes at least including:
        an auxiliary brake mode for applying a brake force of the backward braking brake shoe to the brake drum, and
        a brake release mode for not applying the brake force by the backward braking brake shoe; and
    a member for causing the backward braking brake shoe to move away from or to press against the inner circumferential surface of the brake drum, wherein, in the auxiliary brake mode, the backward braking brake shoe is pressed against the inner circumferential surface of the brake drum, and in the brake release mode, the backward braking brake shoe is held at a position apart from the inner circumferential surface of the brake drum.

6. A brake apparatus according to claim 5,
    wherein the backward braking brake shoe is provided at a position where the contact surface is brought into contact with the inner circumferential surface of the brake drum for effecting a self-locking.

7. A brake apparatus according to claim 5 or 6, further comprising:
    a pair of main brake shoes rotatably supported on the back plate, so as to be pressed by an expansion means against an inner circumferential surface of the brake drum which rotates together with a wheel, and to restrict the rotation of the wheel in a forward direction and a backward direction, wherein a contact surface of the backward braking brake shoe with the brake drum is disposed between a contact surface of one brake shoe of the pair of brake shoes with the brake drum and the expansion means, the modes further includes a main brake mode for braking the rotation of the brake drum by the pair of main brake shoes, and in the brake release mode, the brake on the rotation of the brake drum by the pair of main brake shoes and the backward braking brake shoe are both released.

8. A brake apparatus according to claim 5, wherein the brake apparatus is applied to a wheel chair.

9. A brake apparatus for restricting a rotation of a brake drum rotating together with a rotational shaft of a wheel, comprising:

a first brake means for being activated to an inner circumferential surface of the brake drum to restrict the rotation of the brake drum in both directions;

a second brake means for being activated to the inner circumferential surface of the brake drum to restrict the rotation of the brake drum only in one direction;

a mode selection means for selecting a brake force applied to the brake drum by being changed over to any of:
  a main brake mode for activating the first brake means to the brake drum,
  a brake release mode for making to be inoperative both the first brake means and the second brake means, and
  an auxiliary brake mode for activating the second brake means to the brake drum, wherein the first brake means comprises a pair of brake shoes rotatably provided on a stationary shaft supported inwardly of the brake drum, and the second brake means comprises a lock shoe rotatably provided on the stationary shaft and biased so as to be brought into contact with the inner circumference of the brake drum in a normal state, wherein the mode selection means comprises:
  a lock shoe restraining arm for restraining the lock shoe at a position apart from the inner circumferential surface of the brake drum, and
  an actuation cam for pressing the pair of brake shoes against the inner circumferential surface of the brake drum in the main brake mode, for releasing the restraint of the lock shoe by the lock shoe restraining arm in the auxiliary brake mode, and for causing the brake shoes to move apart from the inner circumferential surface of the brake drum and maintaining a restrained state of the lock shoe by the lock shoe restraining arm in the brake release mode.

10. A brake apparatus comprising:

a pair of main brake shoes rotatably supported on a back plate, so as to be pressed by an expansion means against an inner circumferential surface of a brake drum which rotates together with a wheel, and to restrict the rotation of the wheel in a forward direction and a backward direction;

a backward braking brake shoe rotatably supported on the back plate, so as to be brought into engagement with the inner circumferential surface of the brake drum, and to restrict the rotation of the wheel only in the backward direction, wherein a contact surface of the backward braking brake shoe with the brake drum is disposed between a contact surface of one brake shoe of the pair of brake shoes with the brake drum and the expansion means;

a mode selection means for selecting a brake force applied to the wheel by being changed over to any of:
  a main brake mode for braking the rotation of the brake drum by the pair of main brake shoes,
  an auxiliary brake mode for braking the backward rotation of the brake drum by the backward braking brake shoe, and
  a brake release mode in which the brake on the rotation of the brake drum by the pair of main brake shoe and the backward braking brake whole are both released, wherein the mode selection means comprises a member for causing the brake shoes and the backward braking brake shoe to move away from or to press against the inner circumferential surface of the brake drum, in the main brake mode, the backward braking brake shoe is held at a position apart from the inner circumferential surface of the brake drum, and the pair of main brake shoes are pressed against the inner circumferential surface of the brake drum, in the auxiliary brake mode, the backward braking brake shoe is pressed against the inner circumferential surface of the brake drum, and the pair of main brake shoes are held at a position apart from the inner circumferential surface of the brake drum, and in the brake release mode, the pair of main brake shoes are spaced apart from the inner circumferential surface of the brake drum, and the held state of the backward braking brake shoe is maintained.

11. A brake apparatus for restricting a rotation of a wheel via a brake drum rotating together with the wheel, comprising:

a brake shoe having a rotational center which is deviated from a center of the brake drum, the brake shoe including a guide groove including a lock shoe releasing position and a lock shoe restraining position;

a lock shoe restraining arm for restraining the brake shoe at a position apart from the inner circumferential surface of the brake drum, the lock shoe restraining arm being provided with a guide pin passing through the guide groove, when the guide pin is positioned at the lock shoe releasing position, the brake shoe restricts the rotation of the brake drum by a self-locking with the inner surface of the brake drum when the brake drum rotates in one direction, and the self-locking of the brake shoe with the inner surface of the brake drum is released when the brake drum rotates in the other direction, and when the guidepin is positioned at the lock shoe restraining position, the brake shoe is restrained at a position apart from the inner circumferential surface of the brake drum.

12. A brake apparatus according to claim 11, wherein the brake apparatus is applied to a wheel chair.

13. A brake apparatus for restricting a rotation of a wheel via a brake drum rotating together with the wheel, comprising:

a lock shoe for restricting the rotation of the brake drum by a self-energizing effect generated by wedge engagement with an inner circumferential surface of the brake drum only when the brake drum rotates in a backward direction, wherein the lock shoe is formed with a guide groove including a lock shoe releasing position and a lock shoe restraining position;

a brake force selecting means for applying or not applying a brake force to the wheel when selected from modes at least including:

an auxiliary brake mode for applying a brake force of the lock shoe to the brake drum, a brake release mode for not applying the brake force by the lock shoe; and a lock shoe restraining arm for restraining the lock shoe at a position apart from the inner circumferential surface of the brake drum, wherein the lock shoe restraining arm is provided with a guide pin passing through the guide groove, wherein a restrained state of the lock shoe by the lock shoe restraining arm is released in the auxiliary brake mode when the guide pin is positioned at the lock shoe releasing position of the guide groove, and the restrained state of the lock shoe by the lock shoe restraining arm is maintained in the brake release mode when the guide pin is positioned at the lock shoe restraining position of the guide grove.

14. A brake apparatus according to claim 1, wherein the brake apparatus is applied to a wheel chair.

* * * * *